United States Patent
Tsurumoto et al.

(10) Patent No.: US 12,213,503 B2
(45) Date of Patent: Feb. 4, 2025

(54) METHOD OF TREATING PLANT AND METHOD OF MAKING PLANT-BASED FOOD OR DRINK PRODUCT

(71) Applicant: NICHIA CORPORATION, Anan (JP)

(72) Inventors: Tomohiro Tsurumoto, Yokohama (JP); Yasuo Fujikawa, Yokohama (JP); Atsushi Okazawa, Suita (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/393,709

(22) Filed: Aug. 4, 2021

(65) Prior Publication Data

US 2022/0039437 A1 Feb. 10, 2022

(30) Foreign Application Priority Data

Aug. 5, 2020 (JP) .................................. 2020-133211
Dec. 15, 2020 (JP) .................................. 2020-207801
May 11, 2021 (JP) .................................. 2021-080165

(51) Int. Cl.
*A23L 3/28* (2006.01)
*A01G 7/04* (2006.01)
(Continued)

(52) U.S. Cl.
CPC ................ *A23L 3/28* (2013.01); *A01G 7/045* (2013.01); *A23B 7/015* (2013.01); *A23L 5/30* (2016.08); *C12G 1/00* (2013.01); *A23V 2002/00* (2013.01)

(58) Field of Classification Search
CPC ..... A23L 3/28; A23L 5/30; A23L 2/04; A23L 2/50; A23L 19/09; A23B 7/015;
(Continued)

(56) References Cited

U.S. PATENT DOCUMENTS 5,364,645 A * 11/1994 Lagunas-Solar .......... A23L 3/28
426/248
6,190,716 B1 * 2/2001 Galbreath, Jr. ....... A23L 33/105
426/640
(Continued)

FOREIGN PATENT DOCUMENTS

CA 3060371 A1 * 11/2018 ............. A01G 22/00
CN 104126434 A 11/2014
(Continued)

OTHER PUBLICATIONS

Translation of WO 2006/040377A1 (Year: 2006).*
(Continued)

*Primary Examiner* — Drew E Becker
(74) *Attorney, Agent, or Firm* — Birch, Stewart, Kolasch & Birch, LLP

(57) ABSTRACT

The present disclosure relates to a method of increasing an amount of a stilbenoid, and/or one or more compounds selected from the group consisting of TCA cycle metabolites, polyamine alkaloids, 4-aminobutyric acid, abscisic acid and salts thereof in a plant, the method comprising steps of:
irradiating the plant, part, crushed material or cultured plant cell with light, wherein a fluence at a wavelength range of 275-295 nm is 50,000-2,500,000 μmol/m², while at the same time a fluence at a wavelength range of 200-270 nm is less than 20% of the fluence at the wavelength range of 275-295 nm; and
storing the irradiated plant, part, crushed material or cultured plant cell in a dark place for 1 day or more.

13 Claims, 6 Drawing Sheets

(51) Int. Cl.
*A23B 7/015* (2006.01)
*A23L 5/30* (2016.01)
*C12G 1/00* (2019.01)

(58) Field of Classification Search
CPC . A23B 9/06; C12G 1/00; A01G 7/045; A01G 17/005–17/02
See application file for complete search history.

(56) References Cited

U.S. PATENT DOCUMENTS

| | | | |
|---|---|---|---|
| 11,606,912 B2* | 3/2023 | Okazawa | A01G 7/045 |
| 2002/0168429 A1* | 11/2002 | Mann | A61K 36/23 |
| | | | 424/732 |
| 2004/0234671 A1* | 11/2004 | Ector | A23L 19/09 |
| | | | 426/615 |
| 2005/0266143 A1* | 12/2005 | Resurreccion | A23L 5/32 |
| | | | 426/632 |
| 2008/0044539 A1* | 2/2008 | Perlman | A23L 3/349 |
| | | | 426/577 |
| 2009/0047372 A1* | 2/2009 | Miller | A61K 8/8147 |
| | | | 424/766 |
| 2009/0175984 A1* | 7/2009 | Rubin | A23G 4/12 |
| | | | 426/15 |
| 2009/0196951 A1* | 8/2009 | Brandborg | C12G 3/06 |
| | | | 426/519 |
| 2009/0272029 A1* | 11/2009 | Aiking | A23B 7/015 |
| | | | 47/1.3 |
| 2010/0260912 A1* | 10/2010 | Norrie | C12G 1/00 |
| | | | 426/541 |
| 2011/0209404 A1* | 9/2011 | Scott | A01G 7/00 |
| | | | 62/264 |
| 2012/0042419 A1* | 2/2012 | Wilson | A01C 1/00 |
| | | | 800/298 |
| 2013/0057680 A1* | 3/2013 | Hesline | G01J 3/0272 |
| | | | 348/135 |
| 2013/0243928 A1* | 9/2013 | Norrie | C12G 1/00 |
| | | | 426/592 |
| 2015/0005533 A1* | 1/2015 | Boue | C10L 1/02 |
| | | | 44/605 |
| 2015/0173379 A1* | 6/2015 | Lee | G05B 15/02 |
| | | | 700/90 |
| 2015/0284667 A1* | 10/2015 | Edman | C12G 3/055 |
| | | | 426/592 |
| 2016/0030363 A1* | 2/2016 | Keaffaber | A23L 2/52 |
| | | | 514/733 |
| 2016/0073599 A1* | 3/2016 | Wargent | A01G 7/00 |
| | | | 800/317.1 |
| 2016/0235080 A1* | 8/2016 | Ayala Gil | A23L 5/32 |
| 2017/0000041 A1* | 1/2017 | Wargent | A01G 7/04 |
| 2018/0127342 A1* | 5/2018 | Hoang | C07C 37/82 |
| 2018/0255709 A1* | 9/2018 | Topps | A01G 9/249 |
| 2019/0289792 A1* | 9/2019 | Kim | A01G 7/045 |
| 2019/0320670 A1* | 10/2019 | Hathaway | A23L 3/001 |
| 2020/0120878 A1* | 4/2020 | Ko | A01G 22/40 |
| 2020/0178573 A1* | 6/2020 | Naito | C12H 1/165 |
| 2021/0112726 A1* | 4/2021 | Okazawa | A01H 1/101 |
| 2021/0161079 A1* | 6/2021 | Ko | A01G 31/02 |
| 2021/0289710 A1* | 9/2021 | Kim | A01G 9/249 |
| 2022/0313765 A1* | 10/2022 | Tsurumoto | A01G 7/045 |
| 2022/0354063 A1* | 11/2022 | Fujikawa | A01G 31/047 |

FOREIGN PATENT DOCUMENTS

| | | |
|---|---|---|
| JP | 2005-143377 A | 6/2005 |
| JP | 2018-186802 A | 11/2018 |
| WO | WO 02/085137 A1 | 10/2002 |
| WO | WO 2009/014102 A1 | 1/2009 |
| WO | WO 2018/199307 A1 | 11/2018 |
| WO | WO 2021/006342 A1 | 1/2021 |

OTHER PUBLICATIONS

Ripeness estimation of grape berries and seeds by image analysis; Francisco J Rodriguez-Pulido, Computers and Electronics in Agriculture, vol. 82, Mar. 2012, p. 128-133 https://www.sciencedirect.com/science/article/pii/S0168169912000178?via%3Dihub (Year: 2012).*

Machine translation of WO-2006/040377-A1, published on Apr. 20, 2006.

* cited by examiner

\*\* : p<0.01  v.s. Control, t-test

METHOD OF TREATING PLANT AND METHOD OF MAKING PLANT-BASED FOOD OR DRINK PRODUCT

CROSS-SECTION TO RELATED APPLICATIONS

The present application claims priority under 35 USC § 119 to Japanese Patent Application No. 2020-133211, filed on Aug. 5, 2020, Japanese Patent Application No. 2020-207801, filed on Dec. 15, 2020, and Japanese Patent Application No. 2021-80165, filed on May 11, 2021. These applications are incorporated by reference in their entireties.

BACKGROUND

The present disclosure relates to a method of increasing an amount of a stilbenoid, and/or one or more compounds selected from the group consisting of TCA cycle metabolites, polyamine alkaloids, 4-aminobutyric acid, abscisic acid and salts thereof in a plant, a method of producing a plant having increased amount of the stilbenoid and/or the compound(s), a plant having increased amount of the stilbenoid and/or the compound(s), and a food or drink product having increased amount of the stilbenoid.

International Publication WO 02/085137 discloses a method of increasing the resveratrol content in harvested grapes by irradiating the grapes with ultraviolet light (in particular, UV-C light) and storing the irradiated grapes at a room temperature.

There is a need to provide a method of increasing safety and/or efficiently the amount of a stilbenoid (i.e., resveratrol) and/or another useful compound(s) in plants.

SUMMARY

The present disclosure provides increasing an amount of one or more compounds selected from the group consisting of stilbenoids, TCA cycle metabolites, polyamine alkaloids, 4-aminobutyric acid, abscisic acid and salts in a plant, a part thereof, a crushed material of the plant or part, or a cultured plant cell, the method comprising steps of:
irradiating the plant, part, crushed material or cultured plant cell with light, wherein a fluence at a wavelength range of 275-295 nm is 50,000-2,500,000 µmol/m$^2$, while at the same time a fluence at a wavelength range of 200-270 nm is less than 20% of the fluence at the wavelength range of 275-295 nm; and
storing the irradiated plant, part, crushed material or cultured plant cell in a dark place for 1 day or more.

The present disclosure provides a method of increasing an amount of a stilbenoid in a plant, a part thereof (in particular, grape berry skin, or a grape berry including at least berry skin), a crushed material of the plant or part, or a cultured plant cell, the method including steps of:
irradiating the plant, part (in particular, the skin or berry), crushed material or cultured plant cell with light, wherein a fluence at the wavelength range of 275-295 nm is 50,000-2,500,000 µmol/m$^2$, while at the same time a fluence at the wavelength range of 200-270 nm is less than 20% of the fluence at the wavelength range of 275-295 nm; and
storing the irradiated plant, part (in particular, the skin or berry), crushed material or cultured plant cell in a dark place for 1 day or more.

The present disclosure also provides a method of increasing an amount of one or more compounds selected from the group consisting of TCA cycle metabolites, polyamine alkaloids, 4-aminobutyric acid, abscisic acid and salts thereof in a plant, a part thereof, a crushed material of the plant or part, or a cultured plant cell, the method including steps of:
irradiating the plant, part, crushed material or cultured plant cell with light, wherein a fluence at the wavelength range of 275-295 nm is 50,000-2,500,000 µmol/m$^2$, while at the same time a fluence at wavelength range of 200-270 nm is less than 20% of the fluence at wavelength range of 275-295 nm; and
storing the irradiated plant, part, crushed material or cultured plant cell in a dark place for 1 day or more.

The present disclosure also provides a method of producing a plant, a part thereof (in particular, grape berry skin, or a grape berry including at least berry skin), a crushed material of the plant or part, or a cultured plant cell, containing an increased amount of a stilbenoid, the method including steps of:
irradiating the plant, part (in particular, the skin or berry), crushed material or cultured plant cell with light, wherein a fluence at the wavelength range of 275-295 nm is 50,000-2,500,000 µmol/m$^2$, while at the same time a fluence at the wavelength range of 200-270 nm is less than 20% of the fluence at the wavelength range of 275-295 nm; and
storing the irradiated plant, part (in particular, the skin or berry), crushed material or cultured plant cell in a dark place for 1 day or more.

The present disclosure further provides a method of making a food or drink product from a plant, a part thereof (in particular, grape berry skin, or a grape berry including at least berry skin), or a crushed material of the plant or part, the method including steps of:
irradiating the plant, part (in particular, the skin or berry), crushed material or cultured plant cell with light, wherein a fluence at the wavelength range of 275-295 nm is 50,000-2,500,000 µmol/m$^2$, while at the same time a fluence at the wavelength range of 200-270 nm is less than 20% of the fluence at the wavelength range of 275-295 nm;
storing the irradiated plant, part (in particular, the skin or berry), crushed material or cultured plant cell in a dark place for 1 day or more; and
processing the stored plant, part (in particular, the skin or berry), crushed material or cultured plant cell into the food or drink product.

The present disclosure further provides a mature or ripe plant or part thereof (in particular, a ripe grape berry skin, or a ripe grape berry including at least berry skin), the skin having a signal intensity ratio of resveratrol to phenylalanine (the intensity of signal from resveratrol/the intensity of signal from phenylalanine) of 0.5 or more, as determined by mass spectrometry, wherein cells of the plant or part (in particular, the skin) have not been genetically engineered to increase the expression level of an enzyme involved in the biosynthetic pathway of resveratrol.

The present disclosure still further provides a food or drink product made from a plant (in the case where the plant is grape, particularly a wine), having a signal intensity ratio of resveratrol to phenylalanine (the intensity of signal from resveratrol/the intensity of signal from phenylalanine) of 0.5 or more, as determined by mass spectrometry, the food or drink product being made by no use of a genetically engineered plant (in particular, grape) or a part thereof.

DETAILED DESCRIPTION

Figure 1:
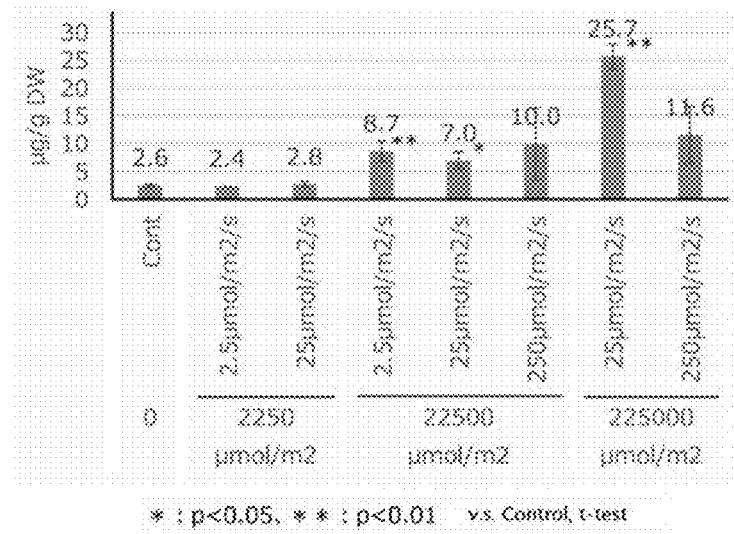
FIG. 1 is a graph showing the relationship between the fluence (2,250, 22,500 or 225,000 µmol/m$^2$) of LED light (peak wavelength: 290 nm) irradiated to harvested and destemmed ripe grape berries (variety: Kyoho) and the resveratrol content (in pg/g dry weight) in the skins of the berries irradiated and then stored in a dark place at 15° C. for 1 day.

Unless defined otherwise, all technical and scientific terms used herein have the same meaning as is commonly understood by one of ordinary skill in the art to which the present disclosure pertains. Although any apparatuses, devices, methods, and materials similar or equivalent to those described herein can be used in the practice or testing of the present disclosure, representative apparatuses, devices, methods, and materials are now described.

As used herein and the appended claims, the singular forms "a", "an" and "the" include plural referents unless the context clearly dictates otherwise. The terms "comprise", "comprising", "include," "including," "have," "has," "having," and the like are intended to be inclusive and mean that there may be additional elements other than the listed elements.

As used herein, a numerical range "a to b" or "a-b" ("a" and "b" represent specific numerical values) means the range including both of the values "a" and "b", that is, the range "between a and b, both inclusive".

In a first aspect, the present disclosure provides a method of increasing an amount of a stilbenoid in a plant, a part thereof (in particular, grape berry skin, or a grape berry including at least berry skin), a crushed material of the plant or part, or a cultured plant cell, the method including steps of:

irradiating the plant, part (in particular, the skin or berry), crushed material or cultured plant cell with light, wherein a fluence at a wavelength range of 275-295 nm is 50,000-2,500,000 µmol/m$^2$, while at the same time a fluence at a wavelength range of 200-270 nm is less than 20% of the fluence at the wavelength range of 275-295 nm; and storing the irradiated plant, part (in particular, the skin or berry), crushed material or cultured plant cell in a dark place for 1 day or more. The method is also referred herein to as "the first increasing method of the present disclosure."

In a second aspect, the present disclosure provides a method of increasing an amount of one or more compounds selected from the group consisting of TCA cycle metabolites, polyamine alkaloids, 4-aminobutyric acid, abscisic acid and salts thereof in a plant, a part thereof, a crushed material of the plant or part, or a cultured plant cell, the method including steps of:

irradiating the plant, part, crushed material or cultured plant cell with light, wherein a fluence at wavelength range of 275-295 nm is 50,000-2,500,000 µmol/m$^2$, while at the same time a fluence at wavelength range of 200-270 nm is less than 20% of the fluence at wavelength range of 275-295 nm; and storing the irradiated plant, part, crushed material or cultured plant cell in a dark place for 1 day or more. The method is also referred herein to as "the second increasing method of the present disclosure."

The first and second increasing methods of the present disclosure are collectively referred hereinafter to as "the increasing methods of the present disclosure."

In another aspect, the present disclosure provides a method of producing a plant, a part thereof (in particular, grape berry skin, or a grape berry including at least berry skin), a crushed material of the plant or part, or a cultured plant cell, containing an increased amount of a stilbenoid, the method including steps of:

irradiating the plant, part (in particular, the skin or berry), crushed material or cultured plant cell with light, wherein a fluence at wavelength range of 275-295 nm is 50,000-2,500,000 µmol/m², while at the same time a fluence at wavelength range of 200-270 nm is less than 20% of the fluence at wavelength range of 275-295 nm; and storing the irradiated plant, part (in particular, the skin or berry), crushed material or cultured plant cell in a dark place for 1 day or more.

In yet another aspect, the present disclosure provides a method of producing a plant, a part thereof (in particular, grape berry skin, or a grape berry including at least berry skin), a crushed material of the plant or part, or a cultured plant cell, containing an increased amount of a stilbenoid, the method including: subjecting a plant, a part thereof (in particular, grape berry skin, or a grape berry including at least berry skin), a crushed material of the plant or part, or a cultured plant cell to any of the increasing methods of the present disclosure.

The two production methods are collectively referred hereinafter to as "the production methods of the present disclosure."

As described in detail below, especially in the Examples, the present disclosure is based on a new finding that irradiation of a harvested plant or part thereof (in particular, grape berry skin), or a cultured plant cell with light in a wavelength range of 275-295 nm, followed by storing it in a dark place for one or more days can increase the amount of a stilbenoid in the plant, part (in particular, the skin) or cultured plant cell. Thus, according to the present disclosure, a plant, a part thereof (in particular, grape berry skin) or a cultured plant cell can be irradiated with light in a specific wavelength range that is effective in increasing the amount of a stilbenoid in the plant, part thereof (in particular, grape berry skin) or cultured plant cell, at a relatively high fluence, while avoiding an adverse effect, such as DNA damage or allergen production, due to exposure to ultraviolet light (specifically UV-C), and thereby increasing safely and/or efficiently the amount of the stilbenoid (in particular, resveratrol) in the plant, part thereof (in particular, grape berry skin) or cultured plant cell.

In the present specification, the plant is not particularly limited and is, for example, a plant capable of producing a stilbenoid and/or a polyamine alkaloid.

In certain embodiments, the plant is not particularly limited so long as it is naturally capable of producing a stilbenoid (in particular, resveratrol). The plant is not particularly limited, but may be, for example, an angiosperm, in particular a dicotyledon so long as a plant capable of producing a stilbenoid and/or a polyamine alkaloid. Examples of dicotyledons suitable for use herein include plants belonging to the families Vitaceae (in particular the genus *Vitis*), Ericaceae (in particular the genus *Vaccinium*), Solanaceae (in particular the genus *Solanum*), Grossulariaceae (in particular the genus *Ribes*), Theaceae (in particular the genus *Camellia*), Malvaceae (in particular the genus *Theobroma*), Polygonaceae (in particular the genera *Fagopyrum* and *Fallopia*), Rutaceae (in particular the genera *Citrus, Fortunella* and *Poncirus*), Amaryllidaceae (in particular the genus *Allium*), Poaceae (in particular the genus *Oryza*), Fabaceae (in particular the genera *Glycine* and *Arachis*), Zingiberaceae (in particular the genera *Zingiber* and *Curcuma*), Rubiaceae (in particular the genus *Coffea*), Brassicaceae (in particular the genera *Brassica* and *Raphanus*), Berberidaceae (in particular the genus *Podophyllum*), Rosaceae (in particular the genera *Fragaria, Cerasus* and *Malus*), Asteraceae (in particular the genus *Lactuca*), Lamiaceae (in particular the genus *Perilla*), Gnetaceae (in particular the genus *Gnetum*) and Lythraceae (in particular the genus *Punica*). The plants include herbs including *Plantago asiatica, Houttuynia cordata* and *Gardenia jasminoides*, and plants whose flowers are edible, such as Malva sylvestris and edible chrysanthemum. Specific examples of plants that can be used herein include: grape or *Vitis* spp. (producing resveratrol and anthocyanin); mountain cranberry or *Vaccinium vitis-idaea*, including lingonberry or *Vaccinium vitis-idaea* var. *minus* Lodd., and Santa Berry, Japanese knotweed or *Fallopia japonica*, Melinjo or *Gnetum gnemon*, peanut or *Arachis hypogaea*, Almond or *Prunus dulcis*, Apple or *Malus domestica*, pomegranate or *Punica granatum* and strawberry or *Fragaria* ×*ananassa* (producing resveratrol); blueberry or *Vaccinium* Sect. *Cyanococcus*, eggplant or *Solanum melongena*, and blackcurrant or *Ribes nigrum* (producing anthocyanin); tea plant or *Camellia sinensis* (producing catechin); cacao plant or *Theobroma cacao* (producing cacao polyphenols); buckwheat or *Fagopyrum esculentum*, plants belonging to the tribe Citreae (especially the genus *Citrus, Fortunella* and *Poncirus*) and onion or *Allium cepa* (producing rutin), rice or *Oryza sativa* (producing ferulic acid); plants belonging to the family Fabaceae (producing isoflavone); turmeric or *Curcuma longa* (producing curcumin); Ginger or *Zingiber officinale* (producing shogaol); plants belonging to the genus *Coffea* or coffee plant (producing coffee polyphenol).

In the present disclosure, the plant may be a seedling or juvenile plant, or a mature or adult plant. Alternatively, the plant may be in vegetative growth stage or reproductive growth stage. As used herein, the term "seedling plant" or "juvenile plant" refers to a germinated plant (in particular, rooted plant) at a plant age of, for example, 10 leaves or less, particularly 7 leaves or less, more particularly 5 leaves or less, and more particularly 3 leaves or less. As used herein, the term "mature plant" or "adult plant" refers to a plant at a plant age of, for example, 3 leaves or more, particularly 5 leaves or more, more particularly 7 leaves or more, and more particularly 10 leaves or more. In certain embodiments, the plant has been harvested or is a harvest.

In the present disclosure, the cultured plant cell can be from any of the above-mentioned plants. The cultured plant cell may be in suspension culture or in callus culture.

Preferably, the plant, part or the crushed material used herein can be used for food, drink or medicinal use, as it is, or in the form of extract or processed product.

In preferred embodiments, the plant is grape plant or a plant of the genus *Vitis* (*Vitis* spp.).

Preferably, therefore, the present disclosure relates to a method of increasing an amount of a stilbenoid in grape berry skin, or a grape berry including at least berry skin, or a crushed material thereof; a method of producing grape berry skin, or a grape berry including at least berry skin, or a crushed material thereof, containing an increased amount of a stilbenoid; grape berry skin, or a grape berry including at least berry skin, or a crushed material thereof, having an increased amount of a stilbenoid; and a food or drink product (such as alcoholic drink made from fruits, in particular wine) having an increased amount of a stilbenoid.

As used herein, the term "plant" includes any parts thereof unless the context clearly indicates that it is intended to mean only the whole plant. A "part" or "parts" of a plant is/are one or more organs selected from its root system, stems, leaves, flowers and fruits, or one or more components of the organs (such as pericarp, a component of fruit), and may be, for example, shoot system (stems and leaves, and optionally flowers and/or fruits), stem, leaf, fruit or pericarp.

Preferably, the cells of the plant or part have not been genetically engineered to increase the expression level of an enzyme involved in the biosynthetic pathway of a compound to be increased.

A "crushed material" of the plant or part is a resulting material obtained by physical destruction (e.g., cutting and/or compressing) of the plant or part and in which material at least some of the plant cells contained are alive. The crushed material may be, for example, a piece or residue of organ or tissue.

As used herein, "grape" is not particularly limited so long as it belongs to the genus Vitis (Vitis spp.) and may be an interspecific hybrid within the genus Vitis.

Grape may belong to, for example, the species Vitis vinifera, Vitis labrusca, Vitis amurensis, Vitis mustangensis, Vitis riparia or Vitis rotundifolia, or may be a hybrid, preferably an interspecific hybrid, derived from at least one of the said species. Preferably, grape belongs to the species Vitis vinifera, or a hybrid between Vitis vinifera and one or more species selected from the group consisting of Vitis labrusca, Vitis amurensis, Vitis mustangensis, Vitis riparia, and Vitis rotundifolia.

Examples of grape varieties include, but not limited to, Alianiko/Aglianico, Cabernet Sauvignon, Cabernet Franc, Gamay, Carmenere, Garnacha/Grenache, Sangiovese, Syrah, Zinfandel, Tempranillo, Nebbiolo, Barbera, Pinot Noir, Malbec, Merlot, Montepulciano, Albarino, Viognier, Gewurztraminer, Koshu, Chardonnay, Chenin blanc, Semillon, Sauvignon blanc, Trebbiano, Torrontes, Pinot gris, Furmint, Pedro Ximenez, Muscat of Alexandria, Macabeo, Muscadet, Moscato, Riesling, Concord, Kyoho, Pione, Muscat Bailey A, Shine Muscat, Ruby Roman, Delaware.

Grape used herein is preferable, wherein cells of at least the pericarp have not been genetically engineered to increase the expression level of an enzyme involved in the biosynthetic pathway of resveratrol. Enzymes involved in the biosynthetic pathway of resveratrol typically include phenylalanine ammonia-lyase (PAL), cinnamate 4-hydroxylase (C4H), 4-coumarate:CoA ligase (4CL) and stilbene synthase (STS).

As used herein, the term "genetic engineering" or "genetic modification" refers generally to use of recombinant DNA technology, in particular to recombinant DNA technique, genome editing technique or chemical mutagenesis, but not to use of cross breeding under natural environment. Genetic engineering can be, for example, introduction of an exogenous gene, coding sequence and/or regulatory element (e.g., promoter, enhancer, suppressor or silencer) modification of an endogenous gene, coding sequence and/or regulatory element, and/or deletion of the entirety or a part of an endogenous gene, coding sequence and/or regulatory element.

More preferably, the grape is a non-genetically engineered or modified grape.

As used herein, the term "pericarp" refers more particularly to exocarp, or peel or (outer) skin. The pericarp may have been separated from the pulp. The pericarp includes a piece(s) or a cut(s) of pericarp. In certain embodiment, the pericarp is of a fruit of a harvested plant. In specific embodiments, the pericarp is of a harvested grape berry.

As used herein, the term "fruit" or "berry" may or may not contain seeds or pits so long as it includes at least pericarp, particularly exocarp. The fruit or berry without seeds or pits may be originally seedless (i.e., seedless fruit or berry), or may have the seeds or pits removed. The fruit or berry includes a piece(s) or a cut(s) of fruit or berry. In certain embodiments, the fruit or berry is a harvested grape berry. In specific embodiments, the grape berry may not be destemmed, that is, the berry is in the bunch, or may be destemmed, that is, the berry has been removed from the bunch.

A "crushed material" of fruit or berry may be pressed fruit or berry, or juice-extracted fruit or berry, including at least pericarp, particularly exocarp. Examples of crushed materials include mixtures of pericarp, juice, pulp and seed, such as "must," and mixtures of pericarp and seed, such as "pomace."

The fruit or berry is preferably ripe fruit or berry. The pericarp is preferably is of a ripe fruit or berry. As used herein, the term "ripe fruit" or "ripe berry" refers generally to such a fruit or berry that has been harvested for raw food consumption, for processing, or for making alcoholic drink.

In some embodiments, ripe grape berry may have a sugar content of 15 degrees Brix (° Bx) or more, particularly 16° Bx or more, more particularly 17° Bx or more, more particularly 18° Bx or more, more particularly 19° Bx or more, more particularly 20° Bx or more. In such cases, the upper limit of the sugar content is not particularly limited, but may be, for example, 25° Bx.

In some other embodiments, ripe grape berry may have an acid content (titrating acid:tartaric acid) of 0.9% (or 0.9 g/100 mL) or less, more particularly 0.8% (or 0.8 g/100 mL) or less, more particularly 0.7% (or 0.7 g/100 mL) or less, more particularly 0.6% (or 0.6 g/100 mL) or less, and more particularly 0.5% (or 0.5 g/100 mL) or less.

In some other embodiments, ripe grape berry may have been harvested 70 days or more, more particularly 75 days or more, more particularly 80 days or more, more particularly 85 days or more, more particularly 90 days or more, after full bloom. In such cases, the upper limit of the days after full bloom is not particularly limited, but may be, for example, 125, 120, 115 or 110 days. As used herein, the term "full bloom," in the context of grape, is when 80% or more of all the buds opened or flowered. "Bloom" or "flowering" is the stage at which flower caps (or corollas) fall from the flower.

Whether a grape berry is ripe or not may be determined based on the skin color of the grape berry, for example, by reference to a color chart designed for the species of the subject grape.

In the present disclosure, the light used for irradiating the plant, part (in particular, grape berry skin, or grape berry), crushed material, or cultured plant cell includes light in a wavelength range of 275-295 nm, and preferably is light in a wavelength range of 285-295 nm. Irradiation of the light in such wavelength range to the plant, part (in particular, grape berry skin, or grape berry), crushed material, or cultured plant cell can increase safely and/or efficiently the amount of a stilbenoid and/or the amount of one or more compounds selected from the group consisting of TCA cycle metabolites, polyamine alkaloids, 4-aminobutyric acid, abscisic acid and salts thereof in the plant, part, crushed material or cultured plant cell, while controlling light-induced denaturation of DNA or allergen production.

Because the plant, part, crushed material or cultured plant cell may contain large amounts of other phenolic compounds, which can absorb light in the wavelength range of 275-295 nm, it may be necessary that the light in the wavelength range of 275-295 nm is irradiated at a relatively high fluence to the plant, part, crushed material or cultured plant cell.

For the irradiation of the plant, part, crushed material or cultured plant cell, the lower limit of the fluence at wavelength range of 275-295 nm is 50,000 μmol/m², and may be, for example, 60,000 μmol/m², more particularly 70,000 μmol/m², more particularly 80,000 μmol/m², more particularly 90,000 μmol/m², more particularly 100,000 μmol/m², and more particularly 150,000 μmol/m². It is deduced that the irradiation with light in the wavelength range of 275-295 nm at a fluence of less than 50,000 μmol/m² cannot noticeably activate the biosynthetic pathway of a stilbenoid and/or a TCA cycle metabolite, polyamine alkaloid, 4-aminobutyric acid, abscisic acid and/or a salt thereof via the activation of photoreceptor UCR8, and thereby not achieving an increase in the amount of a stilbenoids and/or of a TCA cycle metabolite, polyamine alkaloid, 4-aminobutyric acid, abscisic acid and/or a salt thereof in the plant, part (in particular, grape berry skin), crushed material, or cultured plant cell.

For the irradiation, the upper limit of the fluence at wavelength range of 275-295 nm is not particularly limited, and may be, for example, 2,500,000 μmol/m², more particularly 2,000,000 μmol/m², more particularly 1,500,000 μmol/m², more particularly 1,000,000 μmol/m², more particularly 900,000 μmol/m², more particularly 800,000 μmol/m², more particularly 700,000 μmol/m², more particularly 600,000 μmol/m², and more particularly 500,000 μmol/m². The irradiation with light in the wavelength range of 275-295 nm at a fluence of more than 2,500,000 μmol/m² is likely to cause noticeable damage to the plant, part (in particularly, grape berry skin or grape berry), crushed material or cultured plant cell, and thereby failing to obtain a plant, part (in particular, grape berry skin or grape berry), crushed material or cultured plant cell having an increased amount of a stilbenoid and/or of a TCA cycle metabolite, polyamine alkaloid, 4-aminobutyric acid, abscisic acid and/or a salt thereof. In addition, even if obtained, it is often not suitable for eating.

For the irradiation, the fluence at wavelength range of 275-295 nm may be in a range combination of any one of the above-mentioned lower limits to any one of the above mentioned upper limits. Examples of the fluence range include, but not limited to, 50,000-2,500,000 μmol/m², 50,000-2,000,000 μmol/m², 50,000-1,500,000 μmol/m², 50,000-1,000,000 μmol/m², 60,000-1,000,000 μmol/m², 70,000-1,000,000 μmol/m², 70,000-800,000 μmol/m², 80,000-800,000 μmol/m², 80,000-500,000 μmol/m², 100,000-500,000 μmol/m², and 120,000-500,000 μmol/m².

Because DNA and RNA have an absorption maximum at around 260 nm wavelength, it is concerned that light at around 260 nm wavelength may have a noticeable adverse effect to plants. Therefore, the fluence at wavelength range of 200-270 nm is preferably less than 20%, more preferably less than 15%, more preferably less than 10%, still more preferably less than 5%, and the most preferably less than 1%, of the fluence at wavelength range of 275-295 nm.

It is also known that light in a wavelength range of 300-400 nm does not contribute to an increase in the amount of a phenolic compound in plants and, what is worse, causes damage to plants (WO 2018/199307). Therefore, the irradiation at a fluence at wavelength range of 300-400 nm that is 50% or more of the fluence at wavelength range of 275-295 nm cannot efficiently achieve a plant, a part thereof (in particular, grape berry skin or grape berry), a crushed material of the plant or part, or a cultured plant cell, having an increased amount of a stilbenoid and/or of one or more compound selected from the group consisting of TCA cycle metabolites, polyamine alkaloids, 4-aminobutyric acid, abscisic acid and/or salts thereof. In view of avoiding an adverse effect to the plant, part (in particular, grape berry skin or grape berry), crushed material, or cultured plant cell, the fluence at wavelength range of 300-400 nm is preferably less than 50%, more preferably less than 40%, more preferably less than 30%, more preferably less than 25%, more preferably less than 20%, more preferably less than 15%, more preferably less than 10%, and more preferably less than 5%, of the fluence at wavelength range of 275-295 nm.

The light in the wavelength range of 275-295 nm is irradiated at a photon flux density of, for example, 0.1 to 1,000 μmol/m²/s. The light at a photon flux density of less than 0.1 μmol/m²/s may not efficiently achieve an increase in the amount of a stilbenoid and/or of one or more compound selected from the group consisting of TCA cycle metabolites, polyamine alkaloids, 4-aminobutyric acid, abscisic acid and/or salts thereof in the plant, part (in particular, grape berry skin or grape berry), crushed material, or cultured plant cell, while maintaining the freshness of the plant, part (in particular, grape berry skin or grape berry), crushed material, or cultured plant cell. With the light at a photon flux density of more than 1,000 μmol/m²/s, damage may be caused in a shorter irradiation time, to the plant, part (in particular, grape berry skin or grape berry), crushed material, or cultured plant cell. The light in the wavelength range of 275-295 nm is preferably irradiated at a photon flux density of 1-1,000 μmol/m²/s, more preferably 1-800 μmol/m²/s, more preferably 2-800 μmol/m²/s, more preferably 2.5-600 μmol/m²/s, more preferably 5-600 μmol/m²/s, more preferably 10 to 600 μmol/m²/s, and more preferably 20-600 μmol/m²/s.

The light source used herein, is not particularly limited as long as it is configured to be capable of emitting light in a wavelength range of 275-295 nm, and may be, for example, any of the commonly used UV light source such as a UV lamp. Examples of UV lamps include light-emitting diodes (LEDs), laser diodes (LDs), xenon lamps, fluorescent lamps, incandescent lamps, metal hydride lamps, high-pressure sodium lamps, and the like. Ultraviolet light may be used, which is extracted from the sunlight using an optical filter or the like.

In the case where the light emitted by the light source used has a ratio of (i) photon flux density at wavelength range of 200-270 nm to (ii) photon flux density at wavelength range of 275-295 nm, that is more than 20%, a filter may be arranged in front of a light emission surface of the light source, which filter has a transmittance to the light in wavelength range of 275-295 nm higher than that of the light in wavelength range of 200-270 nm so that the light has a photon flux density at wavelength range of 200-270 nm that is less than 20%, more particularly less than 15%, less than 10%, less than 5% or less than 1%, of the photon flux density at wavelength range of 275-295 nm at the level of the irradiated plant, part, crushed material or cultured plant cell.

Additionally or alternatively, in the case where the light emitted by the light source used has a ratio of (i) photon flux density at wavelength range of 300-400 nm to (ii) photon flux density at wavelength range of 275-295 nm, that is more than 50%, a filter may be arranged in front of a light emission surface of the light source, which filter has a transmittance of the light in wavelength range of 275-295 nm higher than that of the light in wavelength range of 300-400 nm so that the light has a photon flux density at wavelength range of 300-400 nm that is less than 50%, more particularly less than 40%, less than 30%, less than 25%, less than 20%, less than 15%, less than 10% or less than 5%, of the photon flux density at wavelength range of 275-295 nm, at the level of the irradiated to the plant, part, crushed material or cultured plant cell.

In view of energy efficiency, the irradiated light in the wavelength range of 275-295 nm has the main peak wavelength of, for example, 285±7 nm and more preferably 285±5 nm. It is preferable that no second peak is present or the intensity of the second peak, if any, is one-tenth ($\frac{1}{10}$) or less of that of the main peak. As used herein, the term "main peak wavelength" refers to the peak wavelength at which the intensity is maximum in its spectrum. In the context of light having a single peak, such as LED light, the term "peak wavelength" is synonymous with "main peak wavelength."

The main peak (within the wavelength range of 275-295 nm) preferably has a full width at half maximum of 5 to 15 nm. By use of light having a main peak with a full width at half maximum of 15 nm or less, the plant, part (in particular, grape berry skin or grape berry), crushed material, or cultured plant cell can be irradiated with light in a wavelength range that is effective in increasing the amount therein of a stilbenoid and/or of one or more compounds selected from TCA cycle metabolites, polyamine alkaloids, 4-aminobutyric acid, abscisic acid and/or salts thereof, while avoiding irradiation with light in a wavelength range that does not contribute to the increase (in other words, selective irradiation), and achieve a further increased energy efficiency. It is possible to use light having a main peak with a full width at half maximum of less than 5 nm in the increasing methods and the production methods according to the present disclosure. In view of cost efficiency, however, currently it is preferable to use light having a main peak with a full width at half maximum of 5 nm or more. In some preferred embodiment, the light irradiated to the plant, part (in particular, grape berry skin or grape berry), crushed material, or cultured plant cell has a wavelength spectrum having a peak wavelength at 285±5 nm with a full width at half maximum of 5-15 nm.

It is particularly preferable that the source of light used for irradiating the plant, part (in particular, grape berry skin or grape berry), crushed material, or cultured plant cell according to the present disclosure is a light emitting diode (LED) or a laser diode (LD), having a single peak in its emission spectrum. By the use of an LED or LD, the plant, part (in particular, grape berry skin or grape berry), crushed material, or cultured plant cell can be easily irradiated with the light in a wavelength range that is effective in increasing the amount therein of a stilbenoid and/or of one or more compounds selected from TCA cycle metabolites, polyamine alkaloids, 4-aminobutyric acid, abscisic acid and/ or salts thereof, while avoiding irradiation with light in a wavelength range that does not contribute to increase (in other words, selectively irradiate) the amount therein of a stilbenoid and/or of one or more compounds selected from TCA cycle metabolites, polyamine alkaloids, 4-aminobutyric acid, abscisic acid and/or salts thereof. In view of energy efficiency and economic efficiency, use of an LED or LD is also preferable due to the low heat generation, low power consumption and long life. In addition, the fluence and/or photon flux density can be easily controlled.

An LED capable of emitting ultraviolet light in the wavelength range of 275-295 nm can be formed of, for example, an AlGaN- or InAlGaN-based material.

The fluence at wavelength range of 275-295 nm can be adjusted to 50,000-2,500,000 µmol/m² at the level of the plant, part (in particular, grape berry skin or grape berry), crushed material or cultured plant cell by, for example, controlling switching on and off the light source (if the plant, part (in particular, grape berry skin or grape berry), crushed material or cultured plant cell is stationary) or by controlling the time required for it to pass through the irradiation area (if the plant, part (in particular, grape berry skin or grape berry), crushed material or cultured plant cell is transported by a conveyor, for example).

The light in the wavelength range of 275-295 nm may be irradiated as continuous light or intermittent light or combination thereof to the plant, part (in particular, grape berry skin or grape berry), crushed material or cultured plant cell. It is preferable that the light in the wavelength range of 275-295 nm is intermittently irradiated. The use of intermittent light can avoid or reduce a rise in temperature of the irradiated plant, part (in particular, grape berry skin or grape berry), crushed material or cultured plant cell and/or the light source. The pulse width of the intermittent light may be, for example, 100 ms or less, more particularly 50 ms or less, more particularly 20 ms or less, more particularly 10 ms or less, and more particularly 5 ms or less. The duty ratio of the intermittent light may be, for example, 50% or less, more particularly 40% or less, more particularly 30% or less, more particularly 20% or less, more particularly 10% or less, and more particularly 5% or less.

During irradiation, the plant, part (in particular, grape berry skin or grape berry), crushed material or cultured plant cell may be stationary or in motion. For example, it is being rotated, vibrated, floated or stirred. The plant, part (in particular, grape berry skin or grape berry), crushed material or cultured plant cell may be irradiated during transportation. In certain embodiments, the plant, part (in particular, grape berry skin or grape berry) or crushed material may be irradiated during examination of appearances (for example, sizes and/or or presence/absence of blemishes or decay) and/or quality such as color and/or sugar content.

During irradiation, the plant, part (in particular, grape berry skin or grape berry), crushed material or cultured plant cell may be cooled constantly, periodically or as needed. Cooling can be carried out by, for example, water spraying or water immersion.

The light may be irradiated from one direction or from two or more directions. In the case where the light is irradiated from two directions, they are preferably, but not limited to, the opposing direction such as the above and below, the left and right, or the front and behind directions.

The light in the wavelength range of 275-295 nm is not necessarily irradiated to the whole of the plant or part (in particular, grape berry skin or grape berry, including skin or berry pieces). The light in the wavelength range of 275-295 nm may be irradiated to a limited area of the plant or part (in particular, grape berry skin or grape berry) so long as it is irradiated at a fluence required. For example, the subject plant or part (in particular, grape berry skin or grape berry) may be covered with a mesh, a striped mesh or the like during irradiation.

For the cultured plant cell, the irradiation is preferably carried out so that the light in the wavelength range of 275-295 nm does not substantially pass through the culture medium in order to avoid absorption of the light by the medium. More specifically, to the plant cell cultured on a solid medium, the light in the wavelength range of 275-295 nm is preferably irradiated from the above thereof. In case where the plant cell is cultured in a liquid medium, it is preferable that the light is irradiated to the cell spread on the surface of the medium.

The irradiation of the plant or part with the light in the wavelength rang of 275-295 nm can be carried out by using any one of the plant treatment apparatuses described in WO 2021/006342.

After the irradiation with the light in the wavelength range of 275-295 nm, the plant, part (in particular, grape berry skin or grape berry), crushed material or cultured plant cell is stored in a dark place for 24 hours or more. As used herein, the term "dark place" refers to a place in which the photosynthetic photon flux density does not cause photosynthesis in the pericarp cells, more specifically, the photosynthetic photon flux density 10 µmol/m$^2$/s. The time of the storage in the dark place (hereinafter referred to also as "dark storage") is more particularly 36 hours or more, more particularly 48 hours or more, more particularly 50 hours or more, more particularly 60 hours or more, more particularly 72 hours or more, more particularly 84 hours or more, more particularly 96 hours or more, and more particularly 100 hours or more.

The upper limit of the dark storage time is not particularly limited as long as the content of a stilbenoid and/or of one or more compounds selected from the group consisting of TCA cycle metabolites, polyamine alkaloids, 4-aminobutyric acid, abscisic acid and/or salts thereof in the irradiated plant, part (in particular, grape berry skin or grape berry), crushed material or cultured plant cell is increased as compared with that in unirradiated control plant etc., which is stored in the dark place under the same conditions, without irradiation with the light in the wavelength range of 275-295 nm. For example, in the case where the irradiated plant, part (in particular, grape berry skin or grape berry), crushed material or cultured plant cell is fermented to produce a fermented food or drink product, the dark storage may be carried out by the end of the fermentation, more specifically by the end of pressing or juice-extraction, for example, for a period of no more than 3 weeks, 2 weeks, 1 week, or 5 days. For example, in the case where the irradiated plant, part (in particular, grape berry skin or grape berry), crushed material or cultured plant cell is used as a raw material for a non-fermented food or drink product, the dark storage may be carried out before the start of spoilage, for example, for a period of no more than 10 days (240 hours), 9 days (216 hours), 8 days (192 hours), 7 days (168 hours), 6 days (144 hours), or 5 days (120 hours). The period before the start of spoilage depends on the temperature.

The temperature of the dark storage is not particular limited, and may be a temperature of, for example, 8-38° C., more particularly 10-35° C., and more particularly 10-30° C. For example, in the case where the irradiated plant, part (in particular, grape berry skin or grape berry), crushed material or cultured plant cell is fermented to produce a fermented food or drink product, the dark storage may be carried out at a temperature of 20-35° C., more particularly 21-33° C., more particularly 22-30° C., and more particularly 23-28° C. For example, in the case where the irradiated plant, part (in particular, grape berry skin or grape berry), crushed material or cultured plant cell is used as a raw material for a non-fermented food or drink product, the dark storage may be carried out at a temperature of 10-25° C., more particularly 11-23° C., more particularly 12-20° C., and more particularly 13-18° C.

The dark place may be, for example, in a storage tank including a barrel, a storage house, room or chamber including a refrigerator, a transport container, or a cargo space of freight car, aircraft, vessel, truck or lorry, or in an opaque (light-shielding) packing or packaging material such as a cardboard box.

As used herein, the term "stilbenoid" is not particularly limited so long as it can be naturally synthesized in the plant or part thereof (in particular, grape plant, especially grape berry skin). Examples of stilbenoid include trans- and cis-forms of resveratrol, piceid, ε-viniferin, δ-viniferin, piceatannol, astringin and the like. In the present disclosure, a preferable stilbenoid is resveratrol, particularly trans-resveratrol. The unmodified term "resveratrol" as used herein is intended to include both of trans- and cis-forms.

The expressions "increasing the amount of a stilbenoid," "increasing the content of a stilbenoid," "increased amount of a stilbenoid," "increased stilbenoid content," and the like, as used herein, refer to an increase in the amount of the stilbenoid by, for example, 100% or more, more preferably 200% or more, more preferably 300% or more, more preferably 400% or more, more preferably 700% or more, more preferably 900% or more, more preferably 1,400% or more, more preferably 1,900% or more, and more preferably 2,400% or more, as compared to a non-genetically engineered plant that is of the same species or variety and has been cultivated under natural light irradiation, a part thereof (in particular, grape berry skin or grape berry), or a crushed material of the plant or part.

Analogously, the expressions "increasing the amount of resveratrol," "increasing the content of resveratrol," "increased amount of resveratrol," and the like, as used herein, refer to an increase in the amount of resveratrol by, for example, 100% or more, more preferably 200% or more, more preferably 300% or more, more preferably 400% or more, more preferably 700% or more, more preferably 900% or more, more preferably 1,400% or more, more preferably 1,900% or more, and more preferably 2,400% or more, as compared to a non-genetically engineered plant that is of the same species or variety and has been cultivated under natural light irradiation, a part thereof (in particular, grape berry skin or grape berry), or a crushed material of the plant or part.

Stilbenoids (especially resveratrol) can be quantified by, for example, chromatography. Examples of chromatography include, but not limited to, liquid chromatography (such as HPLC).

For separation of a stilbenoid, a known liquid chromatographic technique can be used so long as it is suitable for the separation of the stilbenoid. It is not limited in regard to the mode of separation. Examples of separation modes include reverse phase chromatography, normal phase chromatography, hydrophilic interaction liquid chromatography (HILIC), ion-exchange chromatography, size-exclusion chromatography. A preferable mode of liquid chromatography is reverse phase chromatography.

For separation of a stilbenoid, the specific conditions of the liquid chromatography can be appropriately determined so that they are suitable for separation of the stilbenoid by the mode of separation used.

In liquid chromatography for separation of a stilbenoid, gradient elution can be used.

Gradient elution liquid chromatography may be carried out with eluent A being water, optionally containing 0.01-10% of an acid, and eluent B being a polar solvent, optionally containing 0.01-10% of an acid, and a gradient from 100:0 to 0:100 (A:B) over 30 to 60 minutes, for example. The flow rate is not particularly limited and may be, for example, 0.1-3 mL/min.

Stilbenoids can be detected by measuring the absorbance at, for example, 190-800 nm.

By application of the first increasing method according to the present disclosure, a plant can be produced in which the amount of a stilbenoid (especially resveratrol) is 3 times or more, for example 4 times or more, more preferably 5 times or more, more preferably 8 times or more, more preferably 10 times or more, more preferably 15 times or more, more preferably 20 times or more, more preferably 25 times or more, of that in a plant (especially a non-genetically engineered plant) that is of the same species or variety and has been cultivated under natural light irradiation, or a part thereof (in particular, grape berry skin or grape berry, or a crushed material thereof). Thus, by application of the increasing methods of the present disclosure, a harvested plant or a part (in particular, grape berry skin or grape berry) can be inexpensively provided as a high-value-added food or a raw material for a high-value-added food or drink product.

In some embodiments of the first increasing method according to the present disclosure, the plant, part (in particular, grape berry skin or grape berry) or crushed material, treated with the method, can has also an increased amount of one or more compounds selected from the group consisting of TCA cycle metabolites, polyamine alkaloids, 4-aminobutyric acid, abscisic acid and salts thereof.

By application of the second increasing method according to the present disclosure, a plant can be produced which has an increased amount of one or more compounds selected from the group consisting of TCA cycle metabolites, polyamine alkaloids, 4-aminobutyric acid, abscisic acid and salts thereof, as compared to a plant (in particular, a non-genetically engineered plant) that is of the same species or variety and has been cultivated under natural light irradiation, or a part thereof.

As used herein, the term "TCA cycle metabolites" include the products and intermediates of the TCA cycle (or citric acid cycle or Krebs cycle). The TCA cycle metabolites are not particularly limited so long as they can be naturally produced in plants (e.g., grape plants, especially the berry skin) and include, for example, pyruvic acid, acetyl-CoA, citric acid, cis-aconitic acid, D-isocitric acid, a-ketoglutaric acid (or 2-oxoglutaric acid), succinyl-CoA, succinic acid, fumaric acid, L-malic acid, and oxaloacetic acid. The TCA cycle metabolites that are acids may be in the form of free acid or salt. Typically, a TCA cycle metabolite is one or more compounds selected from the group consisting of pyruvic acid, acetyl-CoA, citric acid, cis-aconitic acid, D-isocitric acid, a-ketoglutaric acid (or 2-oxoglutaric acid), succinyl-CoA, succinic acid, fumaric acid, L-malic acid, and oxaloacetic acid, and salts thereof.

As used herein, the term "polyamine alkaloids" are basic organic compounds (preferably linear aliphatic hydrocarbons) having two or more amino group and not particularly limited so long as they can be naturally produced in plants (e.g., grape plants, especially berry skin) and include, for example, agmatine, putrescine, cadaverine, spermidine, N'-acetyl spermidine, carboxyspermidine, norspermidine, homospermidine, aminopropyl homospermidine, spermine, N'-acetyl spermine, norspermine, thermospermine, homospermine, canavalmine, and 1,3-diaminopropane. Typically, a polyamine alkaloid is one or more compounds selected from the group consisting of putrescine, spermidine and spermine. Polyamine alkaloids may be in the form of acid or salt.

4-Aminobutyric acid and abscisic acid may be in the form of free acid or salt.

As used herein, the expressions "increasing the amount of one or more compounds selected from the group consisting of TCA cycle metabolites, polyamine alkaloids, 4-aminobutyric acid, abscisic acid and salts thereof," "increasing the content of one or more compounds selected from the group consisting of TCA cycle metabolites, polyamine alkaloids, 4-aminobutyric acid, abscisic acid and salts thereof," "increase amount of one or more compounds selected from the group consisting of TCA cycle metabolites, polyamine alkaloids, 4-aminobutyric acid, abscisic acid and salts thereof" and the like refer to an increase in the amount of the compound by, for example, 20% or more, more preferably 50% or more, more preferably 100% or more, more preferably 200% or more, more preferably 300% or more, more preferably 400% or more, and more preferably 500% or more, as compared to a non-genetically engineered plant that is of the same species or variety and has been cultivated under natural light irradiation, a part thereof (in particular, grape berry skin or grape berry), or a crushed material of the plant or part.

A compound(s) of interest, such as one or more compounds selected from the group consisting of TCA cycle metabolites, polyamine alkaloids, 4-aminobutyric acid, abscisic acid and salts thereof, can be quantified by, for example, chromatography and/or mass spectrometry. Examples of chromatography include, but not limited to, liquid chromatography (such as HPLC) and gas chromatography.

The separation by liquid chromatography (LC) is as described above for stilbenoids.

The separation by gas chromatography (GC) can be carried out with a known gas chromatographic technique so long as it is suitable for the separation of the compound of interest. For gas chromatography, the specific conditions can be appropriately determined so that they are suitable for separation of the compound of interest.

The separation by mass spectrometry (MS) can be carried out with a known mass spectrometric technique so long as it is suitable for the separation of the compound of interest. It is not limited in regard to the mode of ionization or the mode of mass separation. Examples of ionization modes include electron ionization, electrospray ionization, chemical ionization. Examples of mass separation modes include magnetic sector mass spectrometry, quadrupole mass spectrometry, and ion trap mass spectrometry.

Mass spectrometry may be coupled to liquid chromatography or gas chromatography.

Plants treated with any of the increasing methods of the present disclosure or produced by certain production methods of the present disclosure, parts thereof (in particular, grape berry skin or grape berry) and crushed materials of the plants or parts are suitable as raw materials for preparation of plant-based (especially grape-based) food or drink products having a high content of a stilbenoid (especially resveratrol).

In still another aspect, therefore, the present disclosure also provides a method of making a food or drink product, the method including steps of:

(a) irradiating a plant, a part thereof (in particular, grape berry skin, or a grape berry including at least berry skin), or a crushed material of the plant or part with light, wherein a fluence of light in wavelength range of 275-295 nm is 50,000-2,500,000 µmol/m$^2$, while at the same time a fluence of light in wavelength range of 200-270 nm is less than 20% of the fluence of the light in wavelength range of 275-295 nm;

(b) storing the irradiated plant, part (in particular, the skin or berry) or crushed material in a dark place for 1 day or more; and (c) processing the plant, part (in particular, the skin or berry) or crushed material obtained in the step (b) into the food or drink product. The method is also referred herein to as the "food or drink making method of the present disclosure."

The food or drink making method of the present disclosure may be described as including steps of:
(a) subjecting a plant, a part thereof (in particular, grape berry skin, or a grape berry including at least berry skin), or a crushed material of the plant or part to the first increasing method of the present disclosure; and
(b) processing the plant, part (in particular, the skin or berry) or crushed material obtained in the step (a) into the food or drink product.

The food or drink product may or may not be fermented. The food or drink product may be, for example, dried fruit (e.g., if the plant is grape, raisin), jam, juice, juice drink, soft drink, fruit vinegar, or alcoholic drink made from fruits (herein referred to also as "alcoholic fruit drink"). In the case where the plant is grape, specific examples of alcoholic drink made from fruits include, but not limited to" wine and pomace brandy (e.g., grappa).

The process for making dried fruit includes, for example, drying the plant or part (in particular, grape berry), or crushed material, having increased stilbenoid content, by artificial drying such as sun drying or heated air drying.

The process for making jam includes, for example, boiling down the plant or part (in particular grape berry), or crushed material, having increased stilbenoid content.

The process for making juice, juice drink or soft drink includes, for example, juice extraction from the plant or part (in particular grape berry), or crushed material (preferably, the one not containing seeds), having increased stilbenoid content, and may include further one or more of the steps of enzymatic treatment (pectin degradation), filtration and tartar removal.

The process for making fruit vinegar or alcoholic fruit drink includes, for example, fermenting the plant or part (in particular, grape berry skin or grape berry), or crushed material, having increased stilbenoid content, and may include further one or more of the steps of pressing, aging, sedimentation (or racking), filtration and distillation.

In some embodiments, the food or drink product making method of the present disclosure does not include a step of adding any stilbenoid other than the stilbenoid from the plant, part (in particular, grape berry skin or grape berry), or crushed material used as raw material.

The plant or part (in particular, grape berry skin or grape berry) produced by certain production methods of the present disclosure has a high content of a stilbenoid (especially resveratrol). Alternatively or additionally, the plant or part (in particular, grape berry skin or grape berry) produced by certain production methods of the present disclosure has a high content of one or more compounds selected from the group consisting of TCA cycle metabolites, polyamine alkaloids, 4-aminobutyric acid, abscisic acid and salts thereof.

In still another aspect, therefore, the present disclosure also provides a plant or a part thereof (in particular, grape berry skin, or a grape berry including at least skin), obtainable by subjecting a ripe or mature plant or a part thereof (in particular, grape berry skin, or a grape berry including at least skin) to the first increasing method of the present disclosure.

In still another aspect, the present disclosure also provides a plant or a part thereof (in particular, grape berry skin, or a grape berry including at least skin), wherein the pericarp (in particular, the exocarp or skin) has a signal intensity ratio of resveratrol to phenylalanine (signal intensity of resveratrol/signal intensity of phenylalanine) of 0.5 or more, as determined by mass spectrometry, and wherein cells of the plant or part (particularly the pericarp, and more particularly the exocarp or skin) have not been genetically engineered to increase the expression level of an enzyme involved in the biosynthetic pathway of resveratrol. The plant or part is also referred herein to as "the plant or part of the present disclosure."

In certain embodiments, the mature or ripe plant or part is a harvested plant or a part thereof.

In the plant or part (in particular, grape berry skin or grape berry) disclosed herein, the pericarp (in particular, the exocarp or skin) has a signal intensity ratio of resveratrol to phenylalanine (signal intensity of resveratrol/signal intensity of phenylalanine) of 0.50 or more, more preferably 0.51 or more, more preferably 0.52 or more, more preferably 0.53 or more, and more preferably 0.54 or more, as determined by mass spectrometry.

Mass spectrometry (MS) can be carried out with a known mass spectrometric technique so long as it is suitable for analysis of resveratrol and phenylalanine and is not limited in regard to the mode of ionization or the mode of mass separation. Examples of ionization modes include electrospray ionization, atmospheric pressure chemical ionization and atmospheric pressure photo-ionization. Examples of mass separation modes include field focusing mass spectrometry, quadrupole mass spectrometry, time-of-flight mass spectrometry, ion trap mass spectrometry, orbitrap mass spectrometry and ion cyclotron mass spectrometry, either alone, or in tandem or hybrid thereof. In some embodiments, mass spectrometry is MS/MS using electrospray ionization as ionization mode and hybrid quadrupole-orbitrap mass spectrometry as mass separation mode.

Analytical conditions for mass spectrometry can be appropriately determined so that they are suitable for analysis of resveratrol and phenylalanine in the ionization and mass separation modes used.

Prior to mass spectrometry, it is preferable that a fraction containing resveratrol and/or phenylalanine is separated from a sample to be examined, such as pericarp extract (in particular, exocarp or skin extract), by using a known separation method, for example, liquid chromatography (LC).

The separation by liquid chromatography can be carried out with a known liquid chromatographic technique so long as it is suitable for the separation of fraction containing resveratrol and/or phenylalanine. It is not limited in regard to the mode of separation. Examples of separation modes include reverse phase chromatography, normal phase chromatography, hydrophilic interaction liquid chromatography (HILIC), ion-exchange chromatography, size-exclusion chromatography. In some embodiments, liquid chromatography is reverse phase chromatography is employed.

The conditions for liquid chromatography can be appropriately determined so that they are suitable for the separation of fraction containing resveratrol and/or phenylalanine in the separation mode used.

The column used in column chromatography can be appropriately selected from known columns according to the separation mode. The column used in reverse phase chromatography is commonly, but not limited to, an octadecyl silica gel (ODS) column (also referred to as "C18 column").

A mobile phase (eluent) used can be water or a polar organic solvent, or a mixed solvent thereof (e.g., a mixed solvent of water and one or more polar organic solvents, a mixed solvent of two or more polar organic solvents). The polar organic solvent includes, for example, methanol, ethanol, n-propanol, iso-propanol, acetonitrile, acetone, hexanedione, ethyl acetate, dimethyl sulfoxide, dimethyl formamide, ethylene glycol and tetrahydrofuran. The eluent may contain an acid such as formic acid, acetic acid, trifluoroacetic acid, phosphoric acid or trichloroacetic acid, or a base such as ammonia, ammonium formate, ammonium acetate or ammonium hydrogen carbonate, at 0.01-10 M for example.

The flow rate of the mobile phase is not particularly limited and may be, for example, 0.1-2 mL/min.

An extract of pericarp (in particular, the exocarp or skin) can be subjected to liquid spectrometry. The extraction can be carried out by a known technique, for example, solvent extraction.

The solvent used in solvent extraction can be appropriately selected from known solvents. The solvent used can be, for example, water (from room temperature water to boiling water) or a water-miscible organic solvent, or a mixed solvent thereof (a mixed solvent of water and one or more water-miscible organic solvents, a mixed solvent of two or more water-miscible organic solvents). Water may be hot water or boiling water. The water-miscible organic solvent may be a polar organic solvent, including, for example, methanol, ethanol, n-propanol, iso-propanol, acetonitrile, acetone, dioxane, ethyl acetate, dimethyl sulfoxide, dimethyl formamide, ethylene glycol and tetrahydrofuran. The polar organic solvent may contain an acid added thereto. The acid may be, for example, hydrochloric acid, sulfuric acid, formic acid, acetic acid, phosphoric acid, trichloroacetic acid, trifluoroacetic acid or perchloric acid. The organic solvent may contain the acid at a weight ratio of, for example, 0.05-5% and preferably 0.1-3%.

Extraction may be carried out under heating (such as 80-90° C.) and/or increased pressure. Extraction may be reflux extraction. The extraction time is not particularly limited and can be determined appropriately in view of extraction efficiency.

The pericarp (in particular, the exocarp or skin) may be subjected to extraction as it is or after crushing. Before extraction or crushing, the plant may be dried and/or frozen. Drying can be carried out by a known technique and may be by, for example, heated air drying, room temperature drying, reduced pressure drying or freeze drying.

An extract may be filtered with an appropriate filter or centrifuged to remove contaminants, for example.

In some embodiments, the abundance ratio of resveratrol to phenylalanine in the plant, part (in particular grape berry skin) or cultured plant cell is determined by LC-MS/MS method. In specific embodiments, LC is reverse phase chromatography, and MS/MS is hybrid quadrupole-orbitrap MS/MS. In more specific embodiments, LC is reverse phase chromatography using a C18 column, and MS/MS is hybrid quadrupole-orbitrap MS/MS using electrospray ionization as ionization mode.

The cells of the plant or part (in particular, grape berry skin or grape berry) of the present disclosure (in the case where the plant part is grape berry skin or grape berry, at least the skin cells) have not been genetically engineered to increase the expression level of an enzyme involved in the biosynthetic pathway of resveratrol. Enzymes involved in the biosynthetic pathway of resveratrol typically include phenylalanine ammonia-lyase (PAL), cinnamate 4-hydroxylase (C4H), 4-coumarate:CoA ligase (4CL) and stilbene synthase (STS).

The plant or part (in particular, grape berry skin or grape berry) of the present disclosure preferably is a non-genetically engineered plant or a part thereof.

In the grape berry skin or grape berry of the present disclosure, the skin contains, for example, at least 1,500 µg, more particularly at least 1,550 µg, more particularly at least 1,600 µg, and more particularly at least 1,650 µg of resveratrol per gram dry weight.

The grape berry skin or grape berry of the present disclosure may be of a grape belonging to any species (of the above-mentioned species, for example) or any hybrid species (of the interspecific hybrids between the above-mentioned species, for example). The grape berry skin or grape berry of the present disclosure may be from a grape of any variety, more particularly any of the above-mentioned varieties. Preferably, the grape berry skin or grape berry of the present disclosure is of grape belonging to the species *Vitis vinifera*, or an interspecific hybrid between *Vitis vinifera* and one or more species selected from the group consisting of *Vitis labrusca, Vitis amurensis, Vitis mustangensis, Vitis riparia* and *Vitis rotundifolia*. In some embodiments, the grape berry skin or grape berry of the present disclosure is of Muscat Bailey A.

The plant or part (in particular, grape berry skin or grape berry) of the present disclosure is obtainable by subjecting a mature or ripe plant or a part thereof (in particular, grape berry skin or grape berry including at least berry skin) to certain production methods of the present disclosure, but is limited to the one obtained by any of the methods.

Because the plant or part (in particular, grape berry skin or grape berry) of the present disclosure has a high content of a stilbenoid (in particular resveratrol), it is suitable for a raw material for food or drink product (such as alcoholic fruit drink) having a high content of the stilbenoid.

In still another aspect, therefore, the present disclosure also provides an alcoholic fruit drink (i.e., alcoholic drink made from fruits) having a signal intensity ratio of resveratrol to phenylalanine (signal intensity of resveratrol/signal intensity of phenylalanine) of 0.5 or more, as determined by mass spectrometry, which drink is not made from a genetically engineered plant (in particular a genetically engineered grape) or a part thereof. Such an alcoholic fruit drink is also referred herein to as "the alcoholic fruit drink of the present disclosure."

In the case where the plant is grape, the alcoholic fruit drink (i.e., alcoholic drink made from grapes or alcoholic grape drink) of the present disclosure may be, but not limited to, wine (preferably red wine) or pomace brandy (e.g., grappa).

The alcoholic fruit drink (in particular, alcoholic drink made from grapes) of the present disclosure has a signal intensity ratio of resveratrol to phenylalanine (signal intensity of resveratrol/signal intensity of phenylalanine) of 0.50 or more, more preferably 0.51 or more, more preferably 0.52 or more, more preferably 0.53 or more, and more preferably 0.54 or more, as determined by mass spectrometry.

Mass spectrometry for determining signal intensity ratio of resveratrol to phenylalanine in the alcoholic fruit drink of the present disclosure is as described above for the plant or part of the present disclosure.

The alcoholic fruit drink (in particular, alcoholic grape drink) of the present disclosure contains resveratrol at an amount of at least 15 µg/mL, more particularly at least 15.5 µg/mL, more particularly at least 16 µg/mL, and more particularly at least 16.5 µg/mL.

The alcoholic grape drink of the present disclosure may be made from grapes belonging to any species (of the above-mentioned species, for example) or any hybrid species (of the interspecific hybrids between the above-mentioned species, for example). It is preferably made from grapes belonging to the species *Vitis vinifera*, or an interspecific hybrid between *Vitis vinifera* and one or more species selected from the group consisting of *Vitis labrusca*, *Vitis amurensis*, *Vitis mustangensis*, *Vitis riparia* and *Vitis rotundifolia*. In some embodiments, the alcoholic grape drink of the present disclosure is made from Muscat Bailey A.

Additionally or alternatively, the plant or part (in particular, grape berry skin or grape berry) produced by certain production methods of the present disclosure can be preserved for freshness and/or preserved or enhanced for antifungal resistance for a long time after harvest.

In still another aspect, therefore, the present disclosure also provides a method of preserving freshness and/or preserving or enhancing antifungal resistance of a harvested plant, a part thereof (in particular, pericarp or fruit), or a crushed material of the plant or part, the method including: irradiating the plant, part or crushed material with light, wherein a fluence at wavelength range of 275-295 nm is 50,000-2,500,000 μmol/m$^2$, while at the same time a fluence at wavelength range of 200-270 nm is less than 20% of the fluence at wavelength range of 275-295 nm (also referred herein to as "the harvested plant treatment method of the present disclosure").

In some embodiments, the harvested plant treatment method of the present disclosure further includes storing the irradiated plant, part (in particular, pericarp or fruit), or crushed material in a dark place for 1 day or more.

The harvested plant treatment method of the present disclosure can be carried out with any one of the plant treatment apparatuses described in WO 2021/006342.

The terms and phrases "plant," "part" in the context of plant, "crushed material," "light in a wavelength range of 275-295 nm," "light in a wavelength range of 200-270 nm," "fluence," the step of "storing in a dark place," the "light source and irradiation manner of the light in the wavelength range of 275-295 nm" are as described above for the increasing methods of the present disclosure and/or the production methods of the present disclosure.

The freshness can be assessed with a known technique and the assessment may be based on one or more of appearance observation, component measurements and physical measurements. Appearance observation may include observing weight loss rate, shrinking, decay, and/or color (including color of fruit and/or pericarp). Component measurements may include measuring sugar content, acidity, vitamin C content and/or respiration rate. Physical measurements may include measurements of stiffness, color tone and/or texture.

The antifungal resistance can be evaluated with a known technique. For example, the antifungal resistance may be evaluated by inoculating the subject plant with fungus (spores) and then determining whether the fungus is grown on the plant.

EXAMPLES

In the following Examples:
The wavelength measurement was carried out by measuring the emission spectrum on a photonic multichannel analyzer (PMA-11 C7473, Hamamatsu Photonics K.K.);
The irradiance [W/m$^2$] was measured on a photodiode sensor (PD300-UV, Ophir Optronics), whose sensitivity had been calibrated at the peak wavelength of the LED used;

The photon flux density was obtained from the irradiance measurement by using the following conversion formula: photon flux density [mol/m$^2$/s]=irradiance [W/m$^2$]/(Avogadro constant [mol$^{-1}$]×Plank's constant [J·s]×speed of light [m/s]/wavelength [m]); and
The fluence [mol/m$^2$] was calculated as the product of the photon flux density [mol/m$^2$/s] and the irradiation time [sec].

Example 1

Harvested and destemmed ripe grape berries (variety: Kyoho) were irradiated with LED light (peak wavelength: 290 nm) at an irradiance (or with a photon flux density) of 2.5, 25 or 250 μmol/m$^2$/s, giving a fluence of respectively 2,250, 22,500 or 225,000 μmol/m$^2$, and then stored in a dark place at 15° C. for 1 day (or 24 hours). This irradiation and transfer to the dark place of berries were performed on the harvest date.

After 1 day of storage, only the berry skins were freeze-dried and crushed and then subjected to solvent-extraction with 80% methanol. The resulting extracts were subjected to high performance liquid chromatography (Prominence, Shimadzu Corporation) under the analysis conditions described below to quantify resveratrol. As controls, destemmed berries that had been stored in the dark place at 15° C. for 1 day without irradiation were analyzed in the same way. Three samples, each consisting of 3 berries, were analyzed per each experimental group.

<HPLC Conditions>
Column: ODS column (Triart C18, 150×4.6 mm, S-5 μm, YMC)
Column temperature: 40° C.
Flow rate: 1 mL/min
Injection: 10 μL
Mobile phase:
Eluent A: 0.1% formic acid aqueous solution
Eluent B: 0.1% formic acid in acetonitrile
Linear gradient: 1% to 100% B over 30 minutes
Detection: 190-800 nm
Results:
The berry skin resveratrol content (pg per gram dry weight) determined by HPLC analysis is shown in FIG. 1. In the figure, the ordinate axis represents the berry skin resveratrol content, and the abscissa axis represents the photon flux density (upper row) and the fluence (lower row).

The resveratrol content in grape berry skin was increased with the fluence of the light having a peak wavelength of around 290 nm, irradiated to the grape berries from which the skins were derived.

In the berries irradiated with the light having a peak wavelength of around 290 nm at a fluence of 225,000 μmol/m$^2$, the skin resveratrol content was increased to approximately 4.5-10 times of that in the unirradiated control berries ("Cont" in the figure). In the berries irradiated with the light at a fluence of 2,250 μmol/m$^2$, however, the resveratrol content was not increased, or increased only slightly.

These results show that the irradiation with the light having a peak wavelength of about 290 nm at a fluence of 22,500 μmol/m$^2$ or more can cause an increase of resveratrol content in berry skin.

Without wishing to be bound to theory, in view of the fact that the light at about 280 nm can facilitate the shikimate pathway through the activation (monomerization) of the photoreceptor UVR8 (WO 2018/199307), it can be deduced that increase of stilbenoid content in grape berry skin by irradiation with the light in the wavelength range of 275-295 nm involves the activation of UVR8.

It is believed that irradiation with the light in the wavelength range of 275-295 nm at a too low fluence cannot induce sufficient activation of the photoreceptor UVR8, due to the light-blocking effect of the phenolic compounds that are plant pigments, and thereby not activating the synthetic pathway of stilbenoids in berry skin (refer to the data for the fluence "2,250 µmol/m$^2$" in FIG. 1). It is also believed that irradiation with the light at a too high photon flux density (or irradiance) degrades the phenol compounds synthesized (refer to the data for the photon flux density "250 µmol/m$^2$/s" and the fluence "225,000 µmol/m$^2$" in FIG. 1).

Taken together, it is believed that the amount of stilbenoid in grape berry skin can be efficiently increased by irradiation with the light in the wavelength range of 275-295 nm for a long time at such a photon flux density that leads to the amount of photodegraded stilbenoid less than the amount produced.

Example 2

Harvested and destemmed ripe grape berries (variety: Kyoho) were irradiated with LED light (peak wavelength: 290 nm) at a photon flux density of 250 µmol/m$^2$/s, giving a fluence of 225,000 µmol/m$^2$, and then stored in a dark place at 15° C. for 1 day (or 24 hours) or 2 days (or 48 hours). This irradiation and transfer to the dark place of berries were performed on the harvest date.

Figure 2:
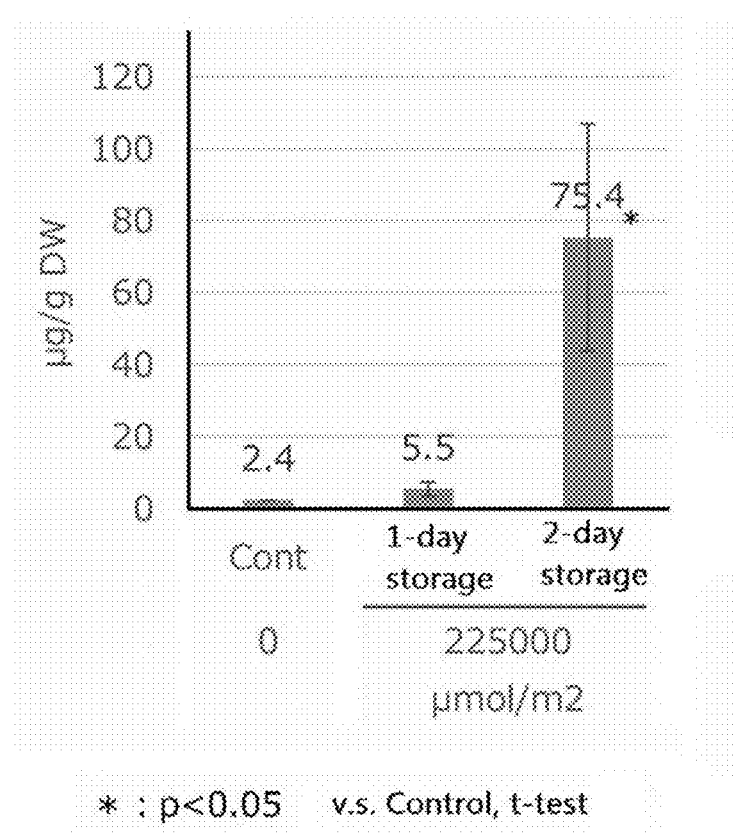
FIG. 2 is a graph showing the relationship between the time for which harvested and destemmed ripe grape berries (variety: Kyoho) were stored in a dark place at 15° C. (1 day or 2 days) after irradiation with LED light (peak wavelength: 290 nm; fluence: 225,000 µmol/m$^2$), and the resveratrol content (in µg/g dry weight) in the skins of the berries.

After storage in the dark place, the berry skins were analyzed for resveratrol content by HPLC, as in Example 1. Three samples, each consisting of 3 berries, were analyzed per each experimental group.
Results:

The HPLC analysis results obtained are shown in FIG. 2. In the figure, the ordinate axis represents the berry skin resveratrol content, and the abscissa axis represents the time of dark storage in day (upper row) and the fluence (lower row).

In the berries stored in the dark place for 48 hours following irradiation, the skin resveratrol content was increased to approximately 31 times of that in the unirradiated controls ("Cont" in the figure).

From these results, it can be seen that a longer dark storage of grape berry skin after irradiation with the light in the wavelength range of 275-295 nm can further increase the amount of stilbenoid in the skin.

Without wishing to be bound to theory, it can be deduced that the irradiation with the light in the wavelength range of 275-295 nm induces the upregulation of the gene encoding an enzyme involved in the biosynthetic pathway of stilbenoids (in particular, resveratrol) and a long dark storage maintains the upregulation for a long time, thereby further increasing the amount of stilbenoid (in particular, resveratrol) synthesized.

Example 3

Bunches of ripe grape berries (variety: Muscat Bailey A), harvested for vinification, were irradiated with LED light (peak wavelength: 290 nm) at a photon flux density of 250 µmol/m$^2$/s, giving a fluence of 225,000 µmol/m$^2$, from one direction for 7.5 min and then from the opposite direction for another 7.5 min. After irradiation, the berries were destemmed and stored in a dark place at 15° C. for 1 day (or 24 hours), 2 days (or 48 hours) or 5 days (or 120 hours). This irradiation and transfer to the dark place of berries were performed on the harvest date.

Figure 3:
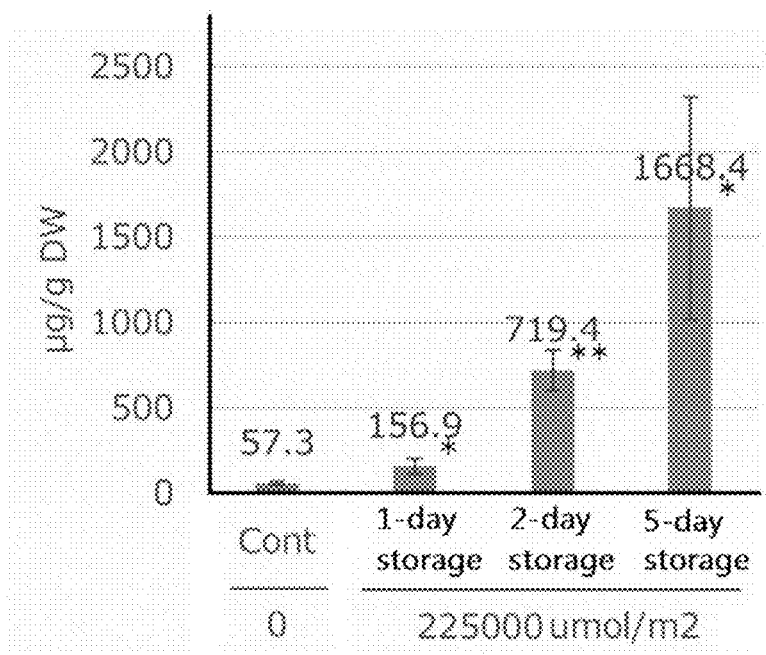
FIG. 3 is a graph showing the relationship between the time for which harvested bunches of ripe grape berries (variety: Muscat Bailey A) were stored in a dark place (1 day, 2 days or 5 days) after irradiation with LED light (peak wavelength: 290 nm; fluence: 225,000 µmol/m$^2$), and the resveratrol content (in µg/g dry weight) in the skins of the berries.

After dark storage, the berry skins were analyzed for resveratrol content by HPLC, as in Example 1. Three samples, each consisting of 3 berries, were analyzed per each experimental group.
Results:

The HPLC analysis results obtained are shown in FIG. 3. In the figure, the ordinate axis represents the berry skin resveratrol content, and the abscissa axis represents the time of dark storage in day (upper row) and the fluence (lower row).

Irradiation with the light in the wavelength range of 275-295 nm increases the skin resveratrol content in the irradiated berries of the variety Muscat Bailey A as well as the variety Kyoho. After dark storage for 1 day, 2 days or 5 days following the irradiation, the resveratrol content was increased to about 2.7 times, 12.57 times, or 29.1 times, respectively, of that in the unirradiated controls. In other words, the skin resveratrol content in the irradiated grape berries continued to increase for at least 5 days of dark storage.

From these results, it can be seen that the irradiation with the light in the wavelength range of 275-295 nm can cause an increase of berry skin stilbenoid (in particular, resveratrol) content in grapes regardless of variety and the dark storage can maintain the activation of the stilbenoid synthetic pathway by the irradiation for at least 5 days.

Example 4

Harvested bunches of ripe grape berries (variety: Muscat Bailey A) were irradiated with LED light (peak wavelength: 290 nm) at a photon flux density of 250 µmol/m$^2$/s, giving a fluence of 225,000 µmol/m$^2$, from one direction for 7.5 min and then from the opposite direction for another 7.5 min. After irradiation, the bunches of berries were stored in a dark place at 15° C. for 2 days (or 48 hours). This irradiation and transfer to the dark place of berries were performed on the harvest date.

Figure 4:
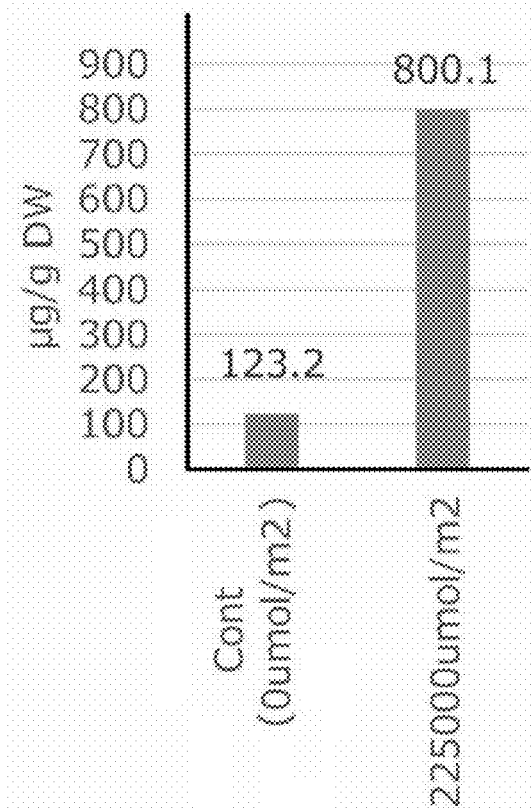
FIG. 4 is a graph showing the resveratrol content (in pg/g dry weight) in the skins of the harvested bunches of ripe berries (variety: Muscat Bailey A) that were irradiated with LED light (peak wavelength: 290 nm; fluence: 225,000 µmol/m$^2$) and then stored in a dark place for 2 days, as compared to that of unirradiated control bunches of berries, which were not irradiated with LED light and were stored in the dark for 2 days after harvest.

After dark storage, the berry skins were analyzed for resveratrol content by HPLC, as in Example 1. As controls, bunches of berries that had been stored in the dark place for 2 day without irradiation were analyzed in the same way. One sample consisting of 3 berries was analyzed per each experimental group.
Results:

The HPLC analysis results obtained are shown in FIG. 4. In the figure, the ordinate axis represents the berry skin resveratrol content, and the abscissa axis represents the fluence.

In the berries irradiated without destemming and then stored in the dark place for 2 days, the skin resveratrol content was increased to approximately 6.5 times of that in the unirradiated control berries without destemming which were stored in the dark place for 2 days.

The skin resveratrol content in the berries dark-stored before destemming is comparable to that in the berries dark-stored after destemming.

Example 5

Bunches of ripe grape berries (variety: Muscat Bailey A), harvested for vinification, were irradiated with LED light (peak wavelength: 290 nm) at a photon flux density of 250 µmol/m$^2$/s, giving a fluence of 225,000 µmol/m$^2$, from one direction for 7.5 min and then from the opposite direction for another 7.5 min. After irradiation, the bunches of berries were stored in a dark place at 15° C. for 2 days (or 48 hours). This irradiation and transfer to the dark place of berries were performed on the harvest date.

After 2 days of storage, only the berry skins were freeze-dried and crushed and then subjected to solvent-extraction with 80% methanol. The resulting extracts were subjected to LC-MS (LC: UltiMate™ 3000, Thermo Fisher Scientific; MS: Q Exactive™, Thermo Fisher Scientific) under the analysis conditions described below to quantify some phenolic compounds including stilbenoids. As controls, berries that had been stored in the dark place for 2 days without irradiation after harvest were analyzed in the same way. One sample consisting of 3 berries was analyzed per each experimental group.

<LC Conditions>
Column: ODS column (InertSustain® AQ-C18 (2.1×150 mm, 3 µm-particle), GL Sciences)
Column temperature: 40° C.
Flow rate: 0.2 mL/min
Injection: 2 µL
Mobile phase:
  Eluent A: 0.1% formic acid aqueous solution
  Eluent B: acetonitrile
LC gradient program:

| Time (min) | 0.0 | 3.0 | 30.0 | 35.0 | 35.1 | 40.0 |
|---|---|---|---|---|---|---|
| Eluent A (%) | 98 | 98 | 2 | 2 | 98 | 98 |
| Eluent B (%) | 2 | 2 | 98 | 98 | 2 | 2 |

Figure 5:
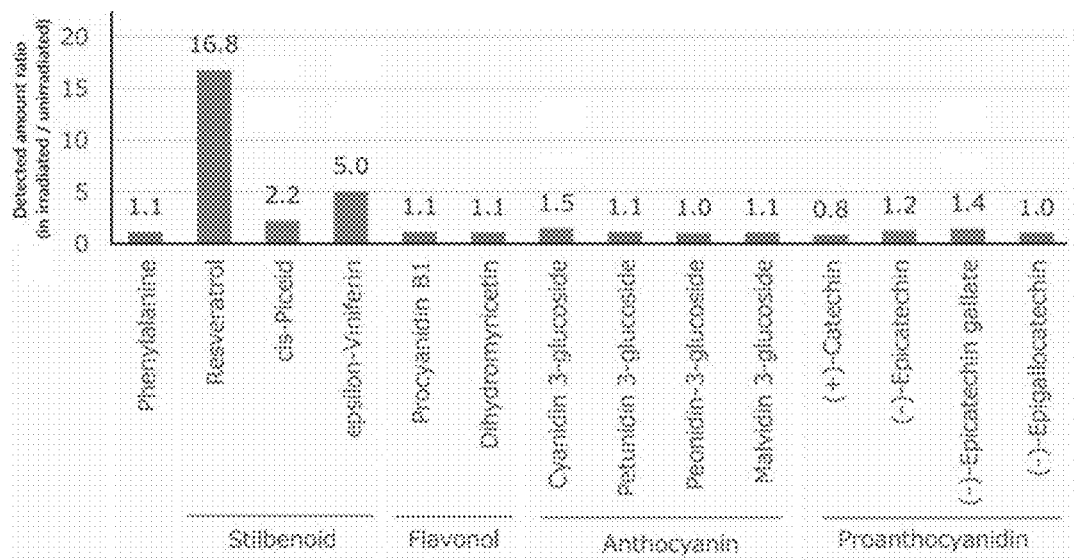
FIG. 5 is a graph showing ratios of detected amounts of some phenolic compounds in the skins of the ripe berries (variety: Muscat Bailey A), the bunches of which were irradiated with LED light (peak wavelength: 290 nm; fluence: 225,000 µmol/m$^2$) and then stored in a dark place for 2 days, to those of the unirradiated control bunches of berries, which were not irradiated with LED light and were stored in the dark for 2 days (or 48 hours) after harvest.

<MS Conditions>
Retention time: 3-30 min
Ionization mode: Electrospray ionization (ESI)
Scan mass range: m/z 80-1200
Full scan resolution: 70,000
MS/MS scan resolution: 17,500
MS/MS precursor selection: Data Dependent Scan (Top 10)
Dynamic Exclusion: 20 sec Results:
The analysis results obtained are shown in Table 1 below and FIG. 5. In the figure, the ordinate axis represents the detected amount ratio of some phenolic compounds in the irradiated and the unirradiated berry skin, and the abscissa axis represents the phenolic compounds analyzed.

| | Intensity | | Intensity Ratio |
|---|---|---|---|
| | (i) Resveratrol | (ii) Phenylalanine | (i)/(ii) |
| Unirradiated/Control | 684996 | 18915276 | 0.04 |
| Irradiated | 11510448 | 21287368 | 0.54 |

The abundance ratio of resveratrol to phenylalanine (as a ratio of signal intensity of resveratrol/signal intensity of phenylalanine) in the berry skin irradiated with the light having a peak wavelength of around 290 nm was 0.54, which was significantly increased as compared with the ratio of 0.04 in the unirradiated controls.

It was also observed that cis-piceid and ε-viniferin (both stilbenoids), cyanidic acid glycoside (an anthocyanin), epicatechin gallate (a proanthocyanidin) as well as resveratrol were increased in the grape berry skin irradiated with the light having a peak wavelength of around 290 nm.

From these results, it can be seen that the irradiation with the light having a peak wavelength of around 290 nm does not generally activate the synthetic pathways of phenolic compounds, but specifically and noticeably activates the synthetic pathway of stilbenoid (in particular, resveratrol).

Example 6

Purchased and destemmed ripe grape berries (variety: Shine Muscat) were irradiated with LED light (peak wavelength: 290 nm) at a photon flux density of 250 µmol/m$^2$/s, giving a fluence of 2,250, 22,500 or 225,000 µmol/m$^2$, and then stored in a dark place at 15° C. for 2 days (or 48 hours).

After dark storage, the berry skins were analyzed for resveratrol content by HPLC, as in Example 1. As controls, berries that had been stored in the dark place for 2 days without irradiation were analyzed in the same way. Three samples, each consisting of 3 berries, were analyzed per each experimental group.

Figure 6:
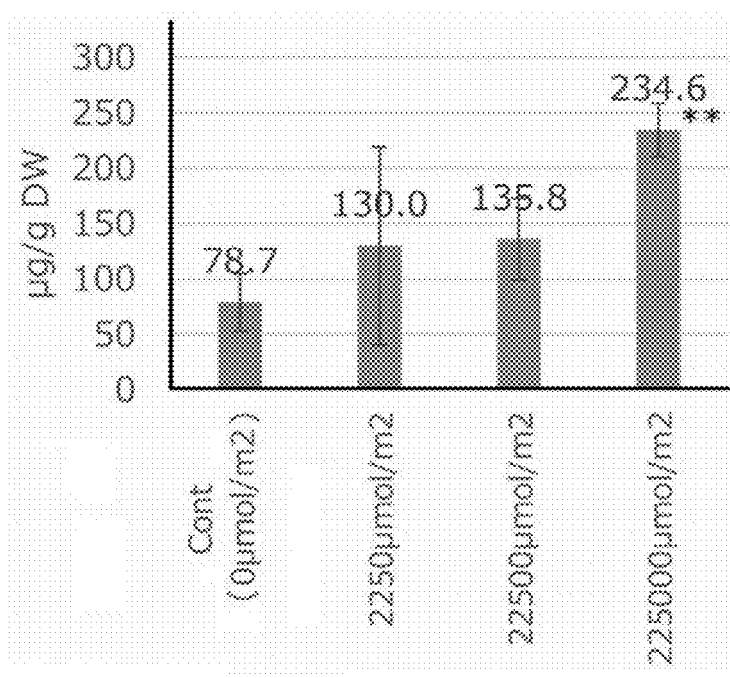
FIG. 6 is a graph showing the relationship between the fluence (0, 2,250, 22,500 or 225,000 µmol/m$^2$) of LED light (peak wavelength: 290 nm) irradiated to the destemmed ripe grape berries (variety: Shine Muscat) that had been purchased at a store, and the resveratrol content (in µg/g dry weight) in the skins of the berries irradiated or unirradiated and then stored in a dark place at 15° C. for 2 days.

Results:
The HPLC analysis results obtained are shown in FIG. 6. In the figure, the ordinate axis represents the berry skin resveratrol content, and the abscissa axis represents the fluence.

In green grapes as well as in red grapes, the skin resveratrol content was increased in the berries irradiated with the light in the wavelength range of 275-295 nm at a fluence of 225,000 µmol/m$^2$, to approximately 3 times of that in the unirradiated controls.

From these results, it can be seen that the irradiation with the light in the wavelength range of 275-295 nm according to the preset disclosure can cause an increase of stilbenoid (in particular, resveratrol) content in grape berry skin regardless of skin color.

Example 7

Purchased and destemmed ripe grape berries (variety: Shine Muscat) were irradiated with LED light (peak wavelength: 290 nm) at a photon flux density of 250 µmol/m$^2$/s, giving a fluence of 225,000 µmol/m$^2$, and then stored in a dark place at 15° C. for 5 days (or 120 hours).

After dark storage, the berry skins were analyzed for resveratrol content by HPLC, as in Example 1.

Figure 7:
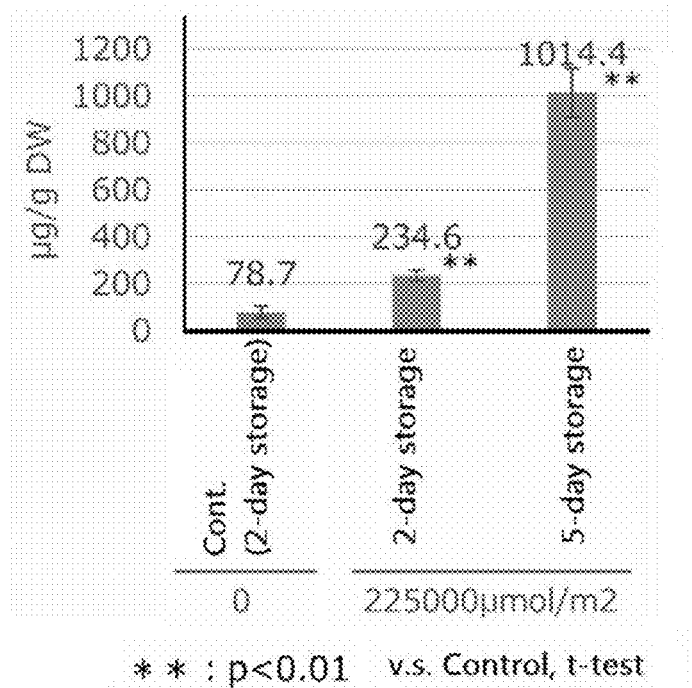
FIG. 7 is a graph showing the resveratrol content (in µg/g dry weight) in the skins of the destemmed ripe grape berries (variety: Shine Muscat) that had been purchased at a store and that were irradiated with LED light (peak wavelength: 290 nm; fluence: 225,000 µmol/m$^2$) and then stored in a dark place for 5 days.

Results:
The HPLC analysis results obtained are shown in FIG. 7. In the figure, the ordinate axis represents the berry skin resveratrol content, and the abscissa axis represents the time of dark storage in day (upper row) and the fluence (lower row). Note that the data for the controls ("Cont") and for the berries stored for 2 days (or 48 hours) following the irradiation are from Example 6.

In green grapes as well as in red grapes, 5-day dark storage following the irradiation with the light in the wavelength range of 275-295 nm increased the berry skin resveratrol content (to approximately 12.9 times of the control level) more than 2-day dark storage following the irradiation did.

From these results, it can be seen that regardless of berry skin color, the skin stilbenoid (in particular, resveratrol) content is increased with the duration of dark storage after the irradiation with the light in the wavelength range of 275-295 nm.

Example 8

Purchased and destemmed ripe grape berries (variety: Delaware) were irradiated with LED light (peak wavelength:

280 nm) at a photon flux density of 600 µmol/m²/s, giving a fluence of 216,000 µmol/m², and then stored in a dark place at 5, 15, 25 or 40° C. for 1 day (24 hours) or 5 days (or 120 hours).

After dark storage, the berry skins were analyzed for resveratrol content by HPLC, as in Example 1. As controls, berries that had not been irradiated or stored in the dark place were analyzed in the same way. One sample consisting of 3 berries was analyzed per each experimental group.

Figure 8:
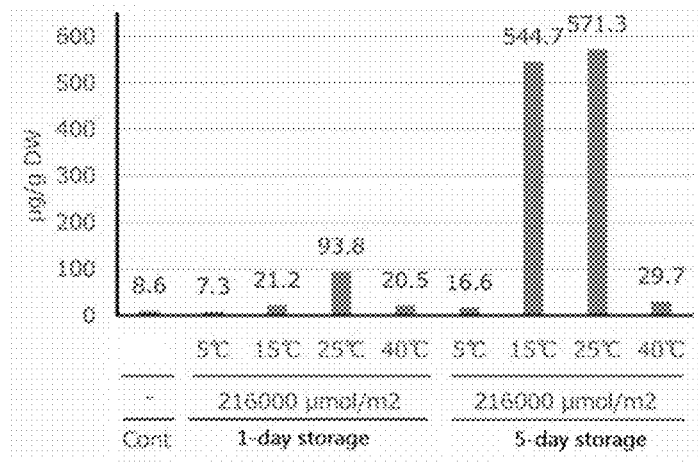
FIG. 8 is a graph showing the relationship between the temperature (5, 15, 25 or 40° C.) and time (1 day or 5 days) of storage in a dark place of destemmed ripe grape berries (variety: Delaware) after irradiation with LED light (peak wavelength: 290 nm; fluence: 216,000 µmol/m$^2$), and the resveratrol content (in µg/g dry weight) in the skins of the stored berries. The ripe grape berries were purchased at a store.

Results:

The HPLC analysis results obtained are shown in FIG. 8. In the figure, the ordinate axis represents the berry skin resveratrol content, and the abscissa axis represents the temperature of dark storage (top row), the fluence (middle row), and the time of storage in day (bottom row).

The berry skin resveratrol content was increased by the dark storage at 15 or 25° C. for 5 days following the irradiation, to more than 60 times of the control level. It was not increased by the dark storage at 5° C. for 1 day, but increased to about 2 times of the control level by the dark storage at 5° C. for 5 days. The berry skin resveratrol content was increased by the dark storage at 40° C. for 1 day and 5 days, to more than 2 and 3 times, respectively, of the control level.

From these results, it can be seen that dark storage at a too low or too high temperature may suppresses an increase in berry skin resveratrol content and dark storage is preferably at a temperature of 15-25° C.

Example 9

Gene Expression Analysis of Grape

Harvested bunches of ripe grape berries (variety: Muscat Bailey A) were irradiated with LED light (peak wavelength: 290 nm) at a photon flux density of 250 µmol/m²/s, giving a fluence of 225,000 µmol/m², from one direction for 7.5 min and then from the opposite direction for another 7.5 min.

Immediately after the second irradiation, only the berry skins were frozen in liquid nitrogen. Then, total RNAs were prepared from the berry skins using the Maxwell® simply RNA plant kit (Promega) according to the Manufacturer's instructions.

The total RNAs prepared were subjected to RNA-seq analysis (Macrogen Japan Corporation). Sequence analysis was carried out with the NovaSeq 6000 system (Illumina, Inc.) on one sample (of 3 berries) per each experimental group.

Table 2 shows the genes with 1.2 times or more increased expression level.

TABLE 2

| Gene ID (NCBI) | Coded enzymes | Fold | Pathway involved |
|---|---|---|---|
| 100242228 | Isocitrate dehydrogenase | 1.7 | TCA cycle |
| 100256776 | Aconitase | 1.3 | |
| 100262907 | Succinate dehydrogenase | 1.2 | |
| 100233080 | Arginine decarboxylase | 1.3 | Synthetic and metabolic pathways of polyamine alkaloids |
| 100244793 | Polyamine oxidase | 1.2 | |
| 100259834 | Primary amine oxidase | 2.6 | |
| 100265470 | Xanthoxin dehydrogenase | 1.5 | Synthetic pathway of abscisic acid |
| 100244362 | 9-Cis-epoxycarotenoid dioxygenase | 4.4 | |
| 100252859 | Carotenoid cleavage dioxygenase 4 | 1.6 | |

It is confirmed that irradiation of plants with the light in the wavelength range of 275-295 nm at a fluence as defined herein upregulates the genes encoding enzymes involved in the TCA cycle, the synthetic and metabolic pathways of polyamine alkaloids and the synthetic pathway of abscisic acid in the plants.

From these results, it can be deduced that in the plants, the TCA cycle, the synthetic and metabolic pathways of polyamine alkaloids and the synthetic pathway of abscisic acid were activated, resulting in increased amounts of products from the pathways.

It was also observed that other than the genes listed in Table 2, the genes associated with the hypersensitive response (RIN4, RPM1, RPS2, EDS1, PAR1, HSP90) and the transcription factors associated with induction of defense-related genes (WRKY22, PIT6) were upregulated 1.2 times or more.

From these results, it can be deduced that plants irradiated with the light in the wavelength range of 275-295 nm at a fluence as defined herein have increased amounts of phytoalexins and infection-specific proteins, resulting in enhanced resistance against pathogens (such as fungi, bacteria and viruses).

Example 10

Gene Expression Analysis of *Arabidopsis thaliana*

*Arabidopsis thaliana* plants were irradiated with LED light (peak wavelength: 280 nm; full width at half maximum: 10 nm; Deep UV-LED, Nichia Corporation) at a photon flux density of 2.5 µmol/m²/s for 45 min (fluence: 6,750 µmol/m²).

The shoots of some of the plants were frozen in liquid nitrogen immediately after the second irradiation. Other plants were stored in a dark place for 2 days (or 24 hours) and then the shoots were frozen in liquid nitrogen. Total RNAs were prepared from the shoots using the NucleoSpin® RNA plant (Takara Bio Inc.) according to the Manufacturer's instructions.

The total RNAs prepared were subjected to RNA-seq analysis (Takara Bio Inc.). Sequence analysis was carried out with the NovaSeq 6000 system (Illumina, Inc.) on three samples per each experimental group.

Table 3 shows the genes with 1.2 times or more increased expression level.

TABLE 3

| Gene ID (EMBL-EBI) | Coded enzymes | Fold (No storage) | Fold (2-day storage) | Pathway involved |
|---|---|---|---|---|
| AT1G04410 | Malate dehydrogenase | | 2.4 | TCA cycle |
| AT1G48030 | Dihydrolipoyl dehydrogenase | | 1.3 | |
| AT1G54340 | Isocitrate dehydrogenase | | 1.5 | |
| AT1G60810 | ATP citrate (Pro-S) lyase | 1.3 | | |
| AT2G05710 | Aconitase | | 1.7 | |
| AT2G17130 | Isocitrate dehydrogenase | 1.1 | 2.0 | |
| AT2G20420 | Succinyl CoA synthetase | | 1.7 | |
| AT2G22780 | Malate dehydrogenase | | 1.9 | |
| AT3G09810 | Isocitrate dehydrogenase | | 2.5 | |
| AT3G15020 | Malate dehydrogenase | | 2.4 | |
| AT3G17240 | Dihydrolipoyl dehydrogenase | | 2.1 | |
| AT3G27380 | Succinate dehydrogenase | 1.6 | 2.8 | |
| AT4G26910 | Oxoglutarate dehydrogenase | 1.4 | | |
| AT4G26970 | Aconitase | | 1.3 | |
| AT4G35260 | Isocitrate dehydrogenase | | 1.9 | |

TABLE 3-continued

| Gene ID (EMBL-EBI) | Coded enzymes | Fold (No storage) | Fold (2-day storage) | Pathway involved |
|---|---|---|---|---|
| AT4G35830 | Aconitase | 1.1 | 1.4 | |
| AT5G03290 | Isocitrate dehydrogenase | | 1.5 | |
| AT5G08300 | Succinate CoA ligase | | 2.0 | |
| AT5G40650 | Succinate dehydrogenase | | 2.3 | |
| AT5G43330 | Malate dehydrogenase | | 2.1 | |
| AT5G50950 | Fumarate hydratase | 1.8 | | |
| AT5G66760 | Succinate dehydrogenase | | 2.8 | |
| AT1G62810 | Primary amine oxidase | 1.2 | | Synthetic and metabolic pathways of polyamine alkaloids |
| AT2G02010 | Glutamate decarboxylase | | 1.9 | |
| AT2G16500 | Arginine decarboxylase | 1.6 | 1.5 | |
| AT2G42490 | Primary amine oxidase | | 1.6 | |
| AT3G43670 | Primary amine oxidase | 1.4 | | |
| AT4G12290 | Primary amine oxidase | | 2.1 | |
| AT4G34710 | Arginine decarboxylase | 1.1 | 1.4 | |
| AT5G13700 | Polyamine oxidase | | 18.3 | |
| AT5G17330 | Glutamate decarboxylase | | 2.2 | |
| AT1G30100 | 9-Cis-epoxycarotenoid dioxygenase | | 564.1 | Synthetic pathway of abscisic acid |
| AT1G52340 | Xanthoxin dehydrogenase | | 1.3 | |
| AT2G29090 | (+)-Abscisic acid 8'-hydroxylase | 2.9 | | |
| AT3G14440 | 9-Cis-epoxycarotenoid dioxygenase | 1.5 | 2.5 | |
| AT4G18350 | 9-Cis-epoxycarotenoid dioxygenase | 62.7 | 34.7 | |
| AT4G19230 | (+)-Abscisic acid 8'-hydroxylase | | 1.9 | |
| AT5G45340 | (+)-Abscisic acid 8'-hydroxylase | | 3.1 | |

It is confirmed that in the plants irradiated with the light in the wavelength range of 275-295 nm at a fluence as defined herein, which is different in species from grape plants, genes are upregulated which encode enzymes involved in the TCA cycle, the synthetic and metabolic pathways of polyamine alkaloids and the synthetic pathway of abscisic acid.

The upregulation was observed immediately after irradiation (no storage) and also even after storage for 2 days.

From these results, it can be deduced that in different plants subjected to light irradiation according to the present disclosure, regardless of species, the TCA cycle, the synthetic and metabolic pathways of polyamine alkaloids and the synthetic pathway of abscisic acid are activated, resulting in increased amounts of products from the pathways.

Example 11

*Arabidopsis thaliana* plants were irradiated with LED light (peak wavelength: 280 nm; full width at half maximum: 10 nm; Deep UV-LED, Nichia Corporation) at a photon flux density of 2.5 µmol/m²/s for 45 min (fluence: 6,750 µmol/m²).

After 2 days of dark storage, the shoots were frozen in liquid nitrogen and crushed and then subjected to solvent-extraction.

The resulting extracts were subjected to LC-MS analysis (LC: UltiMate™ 3000 RSLC, Thermo Fisher Scientific; MS: Q Exactive™, Thermo Fisher Scientific) under the analysis conditions 1 or 2 described below, or GC-MC analysis (QP2010 Ultra with AOC-5000 plus, Shimadzu Corporation) under the analysis conditions 3 described below.

Alternatively, the resulting extracts were subjected to methoximination with methoxyamine/pyridine and then to trimethylsilylation with N-methyl-N-trimethylsilyl trifluoroacetamide. The resulting trimethylsilylates were subjected to GC-MC analysis (QP2010 Ultra with AOC-5000 plus, Shimadzu Corporation) under the analysis conditions 4 described below.

Three samples were analyzed per each experimental group.

The solvent-extractions were as follows. For LC-MC analysis under conditions 1, the solvent-extraction was performed with 75% methanol. For LC-MC analysis under conditions 2, the samples (crushed shoot) were each homogenized in 6.5 times amount of a mixed solvent of methanol and methyl tent-butyl ether (MTBE) in the ratio of 3:10 (methanol:MTBE). After adding the mixed solvent to the homogenates, 1.25 times amount of ultrapure water with respect to the samples was added, and the MTBE fractions were collected. For GC-MC analysis under conditions 3, the samples were each homogenized in 13 times amount of a mixed solvent of methanol and MTBE in the ratio of 3:10 (methanol:MTBE). After adding the mixed solvent to the homogenates, 2.5 times amount of ultrapure water with respect to the samples was added, and the MTBE fractions were collected. To the fractions, 10% of boron trifluoride-methanol was then added (subjected to methylesterification). After adding ultrapure water and hexane to the resulting methylesters, the hexane fractions were collected. For GC-MC analysis under conditions 4, the solvent-extraction was performed with 75-80% methanol.

As controls, *Arabidopsis thaliana* plants that had been stored in the dark place for 2 days without irradiation were analyzed in the same way.

<LC-MS Analysis Conditions 1>
<LC Conditions>
  Column: ODS column (InertSustain® AQ-C18 (2.1×150 mm, 3 µm-particle), GL Sciences)
  Column temperature: 40° C.
  Flow rate: 0.2 mL/min
  Injection: 2 µL
  Mobile phase:
    Eluent A: 0.1% formic acid aqueous solution
    Eluent B: acetonitrile
  LC gradient program:

| Time (min) | 0.0 | 3.0 | 30.0 | 35.0 | 35.1 | 40.0 |
|---|---|---|---|---|---|---|
| Eluent A (%) | 98 | 98 | 2 | 2 | 98 | 98 |
| Eluent B (%) | 2 | 2 | 98 | 98 | 2 | 2 |

<MS Conditions>
  Retention time: 3-30 min
  Ionization mode: Electrospray ionization (ESI)
  Scan mass range: m/z 80-1200
  Full scan resolution: 70,000
  MS/MS scan resolution: 17,500
  MS/MS precursor selection: Data Dependent Scan (Top 10)
  Dynamic Exclusion: 20 sec
<LC-MS Analysis Conditions 2>
<LC Conditions>
  Column: ODS column (SunShell C18 (2.1×150 mm, 2.6 µm-particle), ChromNik Technologies)
  Column temperature: 40° C.
  Flow rate: 0.2 mL/min
  Injection: 2 µL
  Mobile phase:
    Eluent A: acetonitrile/water (60:40) containing 0.1% formic acid and 10 mM ammonium formate Eluent B: 2-propanol/acetonitrile (90:10) containing 0.1% formic acid and 10 mM ammonium formate
LC gradient program:

| Time (min) | 0.0 | 10.0 | 20.0 | 35.0 | 45.0 | 55.0 | 55.1 | 60.0 |
|---|---|---|---|---|---|---|---|---|
| Eluent A (%) | 70 | 65 | 45 | 35 | 0 | 0 | 70 | 70 |
| Eluent B (%) | 30 | 35 | 55 | 65 | 100 | 100 | 30 | 30 |

Figure 9:
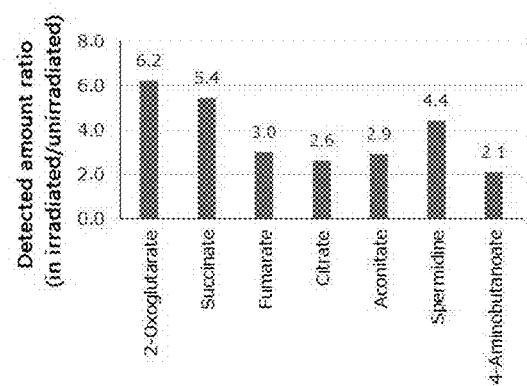
FIG. 9 is a graph showing ratios of detected amounts of some TCA cycle metabolites, spermidine and 4-aminobutyric acid in the plants of *Arabidopsis thaliana*, irradiated with LED light (peak wavelength: 280 nm; fluence: 6,750 µmol/m$^2$) and then stored in a dark place for 2 days, to those of the unirradiated controls, which were stored in the dark for 2 days.

<MS Conditions>
  Retention time: 3-30 min
  Ionization mode: Electrospray ionization (ESI)
  Scan mass range: m/z 80-1200
  Full scan resolution: 70,000
  MS/MS scan resolution: 17,500
  MS/MS precursor selection: Data Dependent Scan (Top 10)
  Dynamic Exclusion: 20 sec
<GC-MS Analysis Conditions 3>
  Column: DB-5 ms (Agilent Technologies)
  Vaporization chamber temperature: 280° C.
  Oven temperature: 40° C. (2 min) to 320° C. (5 min) at temperature rising rate of 6° C./min
  Interface temperature: 280° C.
  Ion source temperature: 280° C.
  Ionization mode: Electron ionization (EI)
  Flow rate: 39 cm/min (1.1 mL/min)
  Scan speed: 2,500 u/sec
  Scan mass range: m/z 45-500
  Injection: 0.5 μL
<GC-MS Analysis Conditions 4>
  Column: DB-5 (30 m×0.250 mm×1.00 μm; Agilent Technologies)
  Vaporization chamber temperature: 280° C.
  Oven temperature: 100° C. (4 min) to 320° C. (8 min) at temperature rising rate of 4° C./min
  Interface temperature: 280° C.
  Ion source temperature: 280° C.
  Ionization mode: Electron ionization (EI)
  Flow rate: 39 cm/min (1.1 mL/min)
  Scan speed: 2,000 u/sec
  Scan mass range: m/z 45-600
  Injection: 0.5 μL The analysis results are shown in FIG. 9 and Table 4 below.

The table lists the compounds having a ratio of the amounts detected in the irradiated and the unirradiated samples of 1.2 or more.

TABLE 4

| Compounds | Ratio | Compounds | Ratio |
|---|---|---|---|
| Pyropheophorbide a | 64624 | Adenine | 2.4 |
| Primary fluorescent chlorophyll catabolite | 25173 | Uridine | 2.3 |
| Octanoic acid | 3818 | Pyridoxal phosphate | 2.2 |
| Biotin | 3675 | L-2-Aminoadipate | 2.2 |
| (R)-S-Lactoylglutathione | 13.7 | 4-Aminobutanoate(GABA) | 2.1 |
| Ophthalmate | 10.2 | Pyridoxine | 2.1 |
| 2-Hydroxyglutarate | 8.4 | Hexahomomethionine | 2.0 |
| Decanoic acid | 7.7 | p-Coumaroylagmatine | 1.9 |
| Dodecanoic acid | 6.3 | Chitobiose | 1.8 |
| 2-Oxoglutarate | 6.2 | Phosphodimethylethanolamine | 1.8 |
| 4-Coumarate | 6.0 | Hexadecanoic acid | 1.8 |
| Panteheine 4'-phosphate | 5.9 | Tetradecanoic acid | 1.7 |
| 3-Mercaptolactate | 5.6 | Guanosine | 1.7 |
| Phytosphingosine | 5.5 | Pyruvate | 1.7 |
| Succinate | 5.4 | Ferulate | 1.6 |

TABLE 4-continued

| Compounds | Ratio | Compounds | Ratio |
|---|---|---|---|
| Spermidine | 4.4 | (S)-Ureidoglycine | 1.5 |
| Xanthosine | 4.0 | (9Z)-Octadecenoic acid | 1.5 |
| Urea | 3.3 | L-Phenylalanine | 1.5 |
| 16-Hydroxypalmitate | 3.3 | Ethanolamine | 1.4 |
| 5'-Methylthioadenosine | 3.1 | Docosanoic acid | 1.3 |
| Fumarate | 3.0 | 2-(Formamido)-N1-(5'-phosphoribosyl)acetamidine (FGAM) | 1.3 |
| cis-Aconitate | 2.9 | Allantoate | 1.3 |
| 3-Hydroxypropanoate | 2.7 | Pantothenate | 1.3 |
| Shikimate | 2.7 | Brassicasterol | 1.2 |
| Citrate | 2.6 | L-Valine | 1.2 |
| Riboflavin | 2.4 | | |

It was observed that in the plant *Arabidopsis thaliana* irradiated with the light in the wavelength range of 275-295 nm at a fluence as defined herein, products from the TCA cycle, the synthetic and metabolic pathways of polyamine alkaloids and the synthetic pathway of abscisic acid were increased in association with the upregulation of genes involved in the cycle and pathways.

Considering these results and the results in Example 9, it can be deduced that also in grape plants (for example berry skin) irradiated with the light in the wavelength range of 275-295 nm at a fluence as defined herein, products from the TCA cycle, the synthetic and metabolic pathways of polyamine alkaloids and the synthetic pathway of abscisic acid are increased in association with the upregulation of genes involved in the cycle and pathways.

Taken together, the irradiation with the light in the wavelength of 275-290 nm at a fluence as defined herein, followed by dark storage for 1 day or more can cause an increased amount of stilbenoid (in particular, resveratrol) and/or an increased amount of one or more compounds selected from the group consisting of TCA cycle metabolites, polyamine alkaloids, 4-aminobutyric acid, abscisic acid and salts thereof, in plants, parts thereof, crushed materials thereof, regardless of species.

Example 12

Callus Induction

Leaves of the plant Bailey Alicante A were immersed in 70% ethanol and then in a sterilizing solution (0.5% sodium hypochlorite, 0.01% Tween 20) for 20 min. After three washes in sterile water, the leaves were cut into pieces of 1 cm square. The leaf pieces were cultured in the culture medium described below at 24° C. in the dark to induce callus. The callus cultures were maintained at 24° C. in the dark by subculturing on a fresh medium every 14 days. During subculturing, white callus and red callus were separated.

Culture Medium Composition
  Murashige and Skoog plant salt mixture for culture medium 1 bag (4.6 g)/L
  2% sucrose
  0.01% myo-inositol
  $1 \times 10^{-4}$% thiamine-HCl
  $6 \times 10^{-5}$% kinetin
  $5 \times 10^{-6}$% 2,4-dichlorophenoxy acetic acid
  1.0% agar, pH 5.8

UV Irradiation and Dark Storage

The cultured plant cells (callus) obtained as described above were irradiated with LED light (peak wavelength: 280 nm; NCSU334B, Nichia Corporation) at a photon flux density of 25 μmol/m²/s, giving a fluence of 50,000 μmol/m², and then stored in a dark place at 23° C. for 2 days. As controls, the cultured plant cells without irradiation were stored in the dark place at 23° C. for 2 days.

Resveratrol Content Analysis

Figure 10:
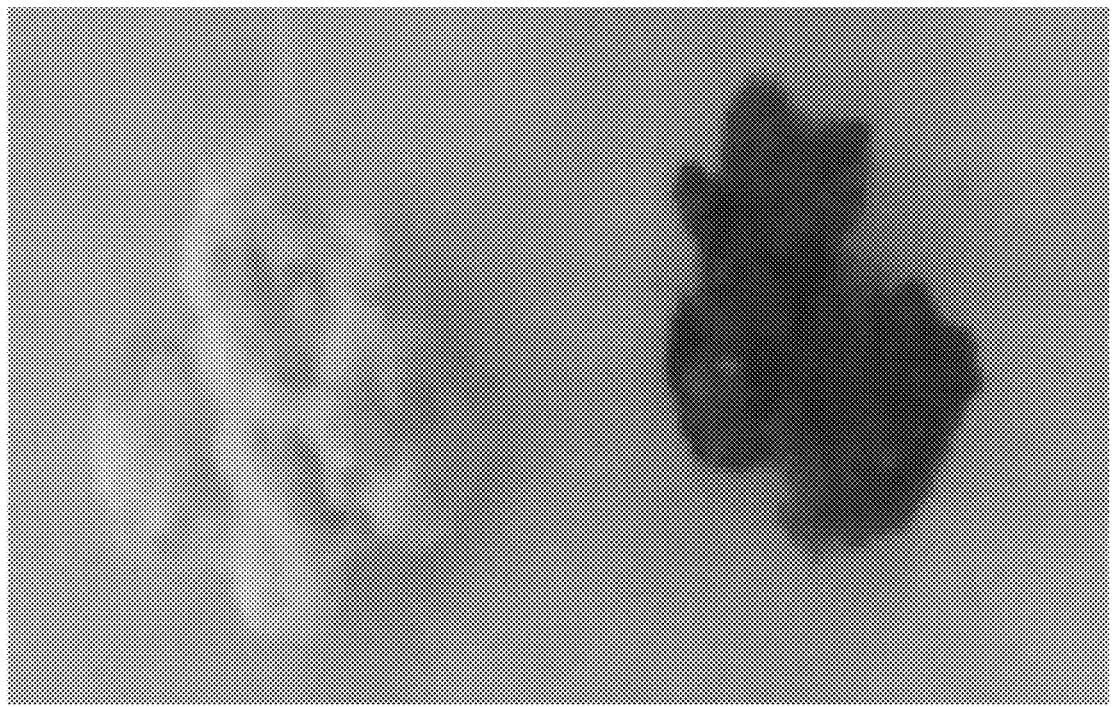
FIG. 10 represents photographs of the white (left) and red (right) callus cultures derived from leaf tissue of "Bailey Alicante A" and used in Example 12.

The analysis was performed on a white culls sample and a red callus sample, each sized approximately 1 cm (length)×1 cm (width)×0.5 cm (height) (volume: approximately 0.5 cm³) (FIG. 10).

After dark storage, the callus samples were freeze-dried and then crushed. The crushed samples were extracted with 80% methanol.

Figure 11:
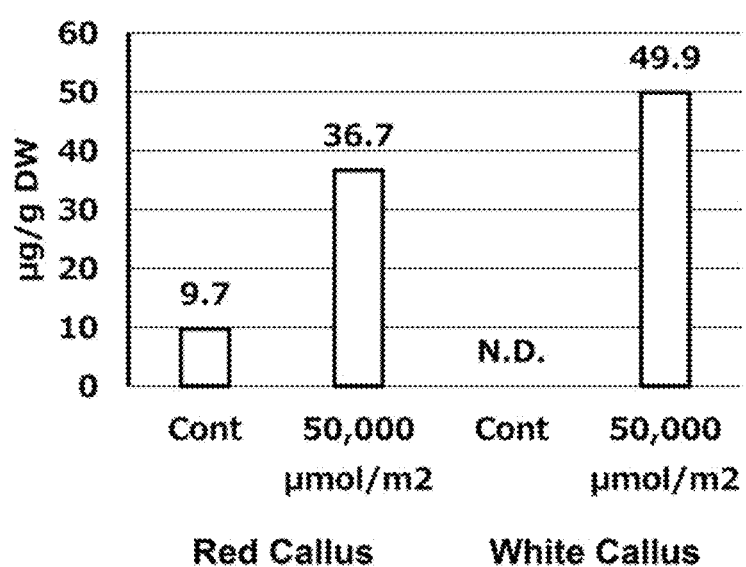
FIG. 11 is a graph showing the resveratrol content (in µg/g dry weight) in the callus cultures (white and red callus cultures) irradiated with LED light (peak wavelength: 280 nm; fluence: 50,000 µmol/m$^2$) and then stored in a dark place for 2 days, as compared to that of unirradiated control callus cultures, which were stored in the dark for 2 days.

The resulting extracts were analyzed by HPLC (Prominence, Shimadzu Corporation) under the following conditions:

<HPLC Conditions>
  Column: ODS column (Triart C18 (150×4.6 mm, S-5 μm), YMC)
  Column temperature: 40° C.
  Flow rate: 1 mL/min
  Injection: 10 μL
  Mobile phase:
    Eluent A: 0.1% formic acid aqueous solution
    Eluent B: 0.1% formic acid in acetonitrile
    Linear gradient
  Detection: 190 to 800 nm Result The content analysis results for resveratrol were shown in FIG. 11.

In white callus, the resveratrol content was increased by the irradiation with the light in wavelength range of around 280 nm at a fluence of 50,000 μmol/m² to about 3.8 times of the control level.

In red callus, the resveratrol was increased by the same irradiation to more than 49.9 times.

These results confirm that the light irradiation followed by the dark storage according to the present disclosure can cause an increase of stilbenoid content in cultured plant cells as well as plants.

Examples of applications according to the present disclosure include lighting devices such as shop lights, lights for showcase or food storage, downlights and others. In shops, vegetables, fruits, fresh flower and other plants that are displayed or stored are irradiated with UV light and then stored in the dark under the conditions according to the present disclosure, outside business hours, thereby increasing useful ingredients in the plants at the start of business hours. In houses, vegetables and fruits in food storage, fresh flower in vases, or other plants are irradiated with UV light and then stored in the dark under the conditions according to the present disclosure during sleeping, thereby increasing useful ingredients in the plants at the time of waking up.

Transporting containers can be provided with an UV emitting device configured to irradiate the inside under the conditions according to the present disclosure so that the plants transported therein have increased amount of useful ingredients at the time of delivery because they were subjected to UV light irradiation and dark storage.

The invention claimed is:

1. A method of increasing an amount of one or more compounds selected from the group consisting of stilbenoids, TCA cycle metabolites, polyamine alkaloids, 4-aminobutyric acid, abscisic acid and salts in a plant cell culture, the method comprising steps of:
   irradiating the plant cell culture with light at a wavelength range of 275-295 nm, at a fluence of 50,000-2,500,000 μmol/m², while at the same time a fluence at a wavelength range of 200-270 nm is less than 20% of the fluence at the wavelength range of 275-295 nm; and then
   storing the irradiated plant cell culture for 1 day or more in a dark place,
   wherein the plant cell culture is a callus cell culture.

2. The method according to claim 1, wherein the irradiating is carried out at a photon flux density at the wavelength range of 275-295 nm of 0.1-600 μmol/m²/s.

3. The method according to claim 1, wherein the irradiating is carried out with light having a wavelength spectrum with a peak wavelength at 285±5 nm and a full width at half maximum of 5-15 nm.

4. The method according to claim 1, wherein the cultured plant cell is stored in the dark place at a temperature of 15-25° C.

5. The method according to claim 1, wherein the cultured plant cell is stored in the dark place for 48 hours or more.

6. The method according to claim 1, wherein the fluence at the wavelength range of 275-295 nm is 100,000-2,500,000 μmol/m².

7. The method according to claim 1, wherein the fluence at the wavelength range of 275-295 nm is 150,000-2,500,000 μmol/m².

8. The method according to claim 1, wherein the irradiating is carried out with intermittent light having a duty ratio of 50% or less.

9. The method according to claim 1, wherein the callus cell culture is red.

10. The method according to claim 9, wherein the red callus cell culture is from a tissue of grape belonging to the species *Vitis vinifera*, or an interspecific hybrid between *Vitis vinifera* and one or more species selected from the group consisting of *Vitis labrusca, Vitis amurensis, Vitis mustangensis* and *Vitis riparia*.

11. The method according to claim 10, wherein the compound is resveratrol.

12. The method according to claim 10, wherein the callus cell culture is red.

13. A method of obtaining or extracting one or more compounds selected from the group consisting of stilbenoids, TCA cycle metabolites, polyamine alkaloids, 4-aminobutyric acid, abscisic acid and salts from cultured plant cells in a callus cell culture, the method comprising steps of:
   subjecting the cultured plant cells to the irradiation method according to claim 1, and then
   obtaining or extracting the compounds from the irradiated cultured plant cells.

* * * * *